United States Patent
Kasten et al.

(10) Patent No.: US 10,208,587 B1
(45) Date of Patent: Feb. 19, 2019

(54) SYSTEM AND METHOD FOR MONITORING INTEGRITY OF A WELLBORE

(71) Applicant: General Electric Company, Schenectady, NY (US)

(72) Inventors: Ansas Matthias Kasten, Niskayuna, NY (US); John Scott Price, Niskayuna, NY (US); Juan Pablo Cilia, Delmar, NY (US); Chengbao Wang, Oklahoma City, OK (US); William Robert Ross, Rotterdam, NY (US); Brian David Yanoff, Niskayuna, NY (US); Stanislav Ivanovich Soloviev, Ballston Lake, NY (US); Sudeep Mandal, Durham, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/688,109

(22) Filed: Aug. 28, 2017

(51) Int. Cl.
*E21B 47/10* (2012.01)
*G21K 1/02* (2006.01)
(Continued)

(52) U.S. Cl.
CPC ........ *E21B 47/102* (2013.01); *E21B 47/1005* (2013.01); *G01T 1/2018* (2013.01);
(Continued)

(58) Field of Classification Search
CPC . E21B 47/102; E21B 47/1005; G01T 1/2018; G01V 5/08; G01V 9/002; G21K 1/025
See application file for complete search history.

(56) References Cited

U.S. PATENT DOCUMENTS

| | | | | |
|---|---|---|---|---|
| 4,180,737 A | * | 12/1979 | Kingsley | ............... G01T 1/1644 250/367 |
| 5,021,652 A | * | 6/1991 | Arnold | ..................... G01T 1/20 250/256 |

(Continued)

OTHER PUBLICATIONS

Harness et al., "Accurate Oil Saturation Determination and Monitoring in a Heavy Oil Reservoir", SPE Western Regional Meeting, 1998,SPE 46245, 11 Pages.

(Continued)

*Primary Examiner* — Marcus Taningco
(74) *Attorney, Agent, or Firm* — GE Global Patent Operation; Seema Katragadda

(57) ABSTRACT

A detector assembly includes scintillators configured to generate a light signal in response to an impinging backscatter signal, where the scintillators are arranged in a first pattern, a plurality of first detectors, where each first detector is coupled to a scintillator and configured to receive a first portion of a light signal from that scintillator, and where the first detectors are arranged in a second pattern aligned with the first pattern, a plurality of second detectors, where each second detector is disposed adjacent a scintillator and configured to receive a second portion of the light signal from that scintillator, and where the plurality of second detectors is arranged in a third pattern, and a scintillator collimator including a plurality of openings and configured to selectively receive the backscatter signal, where the detector assembly is configured to provide depth resolution, azimuthal resolution, a defect type, a defect size, or combinations thereof.

23 Claims, 12 Drawing Sheets

(51) Int. Cl.
*G01V 5/08* (2006.01)
*G01T 1/20* (2006.01)
*G01V 9/00* (2006.01)

(52) U.S. Cl.
CPC ............... *G01V 5/08* (2013.01); *G01V 9/002* (2013.01); *G21K 1/025* (2013.01)

(56) References Cited

U.S. PATENT DOCUMENTS

| | | | |
|---|---|---|---|
| 5,155,366 A * | 10/1992 | Miller | G01T 1/20 250/366 |
| 5,705,812 A * | 1/1998 | Brewer | E21B 47/00 250/264 |
| 6,815,665 B2 | 11/2004 | Storm et al. | |
| 8,455,812 B2 | 6/2013 | Nikitin et al. | |
| 8,742,329 B2 | 6/2014 | Korkin et al. | |
| 8,865,011 B2 | 10/2014 | Philip et al. | |
| 8,975,574 B2 | 3/2015 | Huiszoon et al. | |
| 9,000,359 B2 | 4/2015 | Stoller | |
| 9,052,404 B2 | 6/2015 | Evans et al. | |
| 9,267,359 B2 | 2/2016 | Smaardyk et al. | |
| 9,383,472 B2 * | 7/2016 | Luo | G01T 1/1644 |
| 9,529,097 B1 * | 12/2016 | Dolinsky | G01T 1/1644 |
| 9,645,258 B1 * | 5/2017 | Reyna | G01T 1/20 |
| 2008/0061225 A1 | 3/2008 | Orban et al. | |
| 2009/0101808 A1 * | 4/2009 | Hassan | G01V 5/06 250/265 |
| 2013/0299710 A1 * | 11/2013 | Uchida | G01T 1/202 250/366 |
| 2014/0346337 A1 * | 11/2014 | Huiszoon | G01V 5/08 250/265 |
| 2015/0241594 A1 | 8/2015 | Yang | |
| 2016/0223688 A1 * | 8/2016 | Yamashita | G01T 1/2985 |
| 2016/0282505 A1 * | 9/2016 | Lee | G01V 5/125 |
| 2017/0261639 A1 * | 9/2017 | Hu | G01V 5/12 |

OTHER PUBLICATIONS

Ansas Matthias Kasten et al., "System and Method for Monitoring a Wellbore", GE Application No. 15/688,113, filed on Aug. 28, 2017.

Ansas Matthias Kasten et al,, "Apparatus and Method for Inspecting Integrity of a Multi-Barrier Wellbore", GE Application No. 15/688,102, filed on Aug. 28, 2017.

* cited by examiner

SYSTEM AND METHOD FOR MONITORING INTEGRITY OF A WELLBORE

STATEMENT REGARDING FEDERALLY SPONSORED RESEARCH AND DEVELOPMENT

This invention was made with Government support under contract number DE-FE0024293 awarded by the Department of Energy (DOE). The Government has certain rights in this invention.

BACKGROUND

Embodiments of the present specification generally relate to monitoring of a wellbore, and more specifically to a system and method for monitoring the integrity of a wellbore.

The wellbore typically includes a production tubing and concentric rings of metal casings with cement annuli between the rings of metal casing. It is desirable to monitor an integrity of the wellbore to identify presence of any defects in the wellbore. Detection of defects in the metal casings and/or the cement annuli in multi-barrier wellbores such as multi-barrier hydrocarbon producing wellbores is a challenging task.

Certain currently available techniques for monitoring the integrity of the wellbore disadvantageously entail retrieving the long metal tubing from the wellbore for inspection of the casings and/or the cement annuli structure. In addition, detection of defects beyond past the first metal casing/cement interface in the multi-barrier wellbore is a difficult task. Some presently available techniques may be suitable for detection of defects in multi-casing wellbores. However, use of these techniques results in poor resolution of defect detection.

BRIEF DESCRIPTION

In accordance with aspects of the present specification, a detector assembly is presented. The assembly includes a plurality of scintillators configured to generate a light signal in response to an impinging backscatter signal from a volume in an object, where the plurality of scintillators is arranged in a first pattern, and where each scintillator of the plurality of scintillators has a first end and a second end. Further, the detector assembly includes a plurality of first detectors, where each first detector of the plurality of first detectors is operatively coupled to the first end of a corresponding scintillator and configured to receive a first portion of a light signal from the corresponding scintillator, and where the plurality of first detectors is arranged in a second pattern that is aligned with the first pattern of the plurality of scintillators. The detector assembly also includes a plurality of second detectors, where each second detector of the plurality of second detectors is disposed adjacent a corresponding scintillator and optically coupled to the second end of the corresponding scintillator and configured to receive a second portion of the light signal from the corresponding scintillator, and where the plurality of second detectors is arranged in a third pattern. Additionally, the detector assembly includes a scintillator collimator configured to selectively receive the backscatter signal, where a first portion of the scintillator collimator is opaque to the backscatter signal, and where a second portion of the scintillator collimator includes a plurality of openings that is transparent to the backscatter signal, where the detector assembly is configured to provide depth resolution, azimuthal resolution, a defect type, a defect size, or combinations thereof.

In accordance with another aspect of the present specification, an inspection tool for monitoring integrity of a wellbore is presented. The inspection tool includes a radiation source. Moreover, the inspection tool includes a detector assembly disposed proximate the radiation source, where the detector assembly includes a plurality of scintillators configured to generate a light signal in response to an impinging backscatter signal from a volume of interest in an object, where the plurality of scintillators is arranged in a first pattern, and where each scintillator of the plurality of scintillators has a first end and a second end, a plurality of first detectors, where each first detector of the plurality of first detectors is optically coupled to the first end of a corresponding scintillator and configured to receive a first portion of a light signal from the corresponding scintillator, and where the plurality of first detectors is arranged in a second pattern that is aligned with the first pattern of the plurality of scintillators, a plurality of second detectors, where each second detector of the plurality of second detectors is disposed adjacent a corresponding scintillator and optically coupled to the second end of the corresponding scintillator and configured to receive a second portion of the light signal from the corresponding scintillator, and where the plurality of second detectors is arranged in a third pattern, and a scintillator collimator configured to selectively receive the backscatter signal, where a first portion of the scintillator collimator is opaque to the backscatter signal, and where a second portion of the scintillator collimator includes a plurality of openings that is transparent to the backscatter signal. In addition, the inspection tool includes a processing unit operatively coupled to the detector assembly, where the processing unit includes at least a processor configured to process signal data from the plurality of first detectors and the plurality of second detectors to determine a condition of the wellbore.

In accordance with yet another aspect of the present specification, a method for monitoring integrity of a wellbore is presented. The method includes positioning an inspection tool in the wellbore, where the inspection tool includes a radiation source, a radiation shield disposed adjacent the radiation source, a detector assembly disposed proximate the radiation source, where the detector assembly includes a plurality of scintillators configured to generate a light signal in response to an impinging backscatter signal from a volume of interest in an object, where the plurality of scintillators is arranged in a first pattern, a plurality of first detectors configured to receive a first portion of a light signal from the corresponding scintillator, where the plurality of first detectors is arranged in a second pattern that is aligned with the first pattern of the plurality of scintillators, a plurality of second detectors, where each second detector of the plurality of second detectors is disposed adjacent a corresponding scintillator, and where the plurality of second detectors is arranged in a third pattern, and a scintillator collimator comprising a first portion and a second portion and configured to selectively receive the backscatter signal, where the first portion of the scintillator collimator is opaque to the backscatter signal, and where the second portion of the scintillator collimator includes a plurality of openings that is transparent to the backscatter signal. Furthermore, the method includes irradiating the volume of interest in the object with a radiation signal generated by the radiation source. The method also includes receiving, by the plurality of scintillators via the plurality of openings in the scintillator collimator, a backscatter signal from the volume of interest.

Also, the method includes obtaining a first set of signal data from the plurality of first detectors and obtaining a second set of signal data from the plurality of second detectors. Moreover, the method includes processing, by a processing unit, the first set of signal data and the second set of signal data to provide a depth resolution and an azimuthal resolution, a defect size, a defect type, or combinations thereof corresponding to a condition of the wellbore.

DRAWINGS

These and other features, aspects, and advantages of the present disclosure will become better understood when the following detailed description is read with reference to the accompanying drawings in which like characters represent like parts throughout the drawings, wherein.

Figure 2:
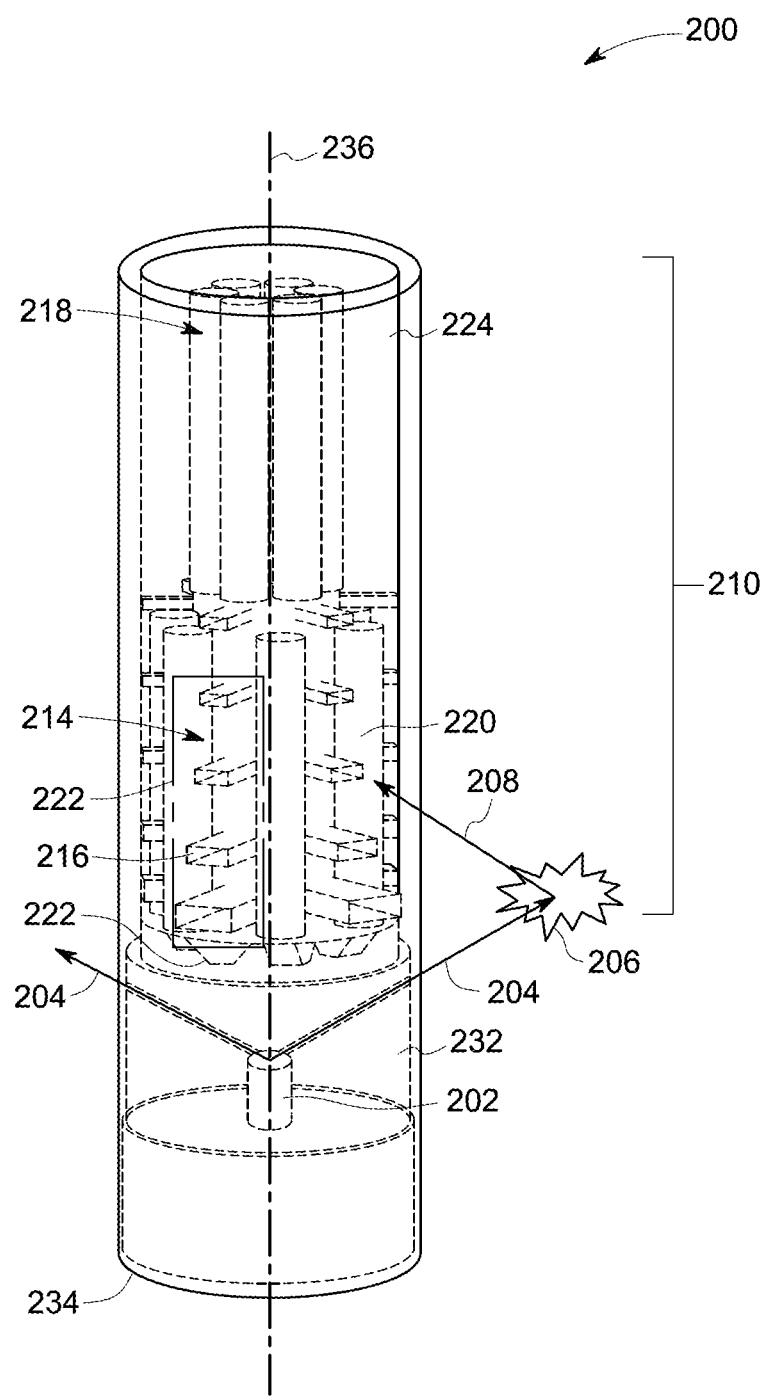
FIG. 2 is a diagrammatical representation of an inspection tool having a detector assembly configured to provide depth and azimuthal resolution for use in the system of FIG. 1, in accordance with aspects of the present specification.
Figure 7A:
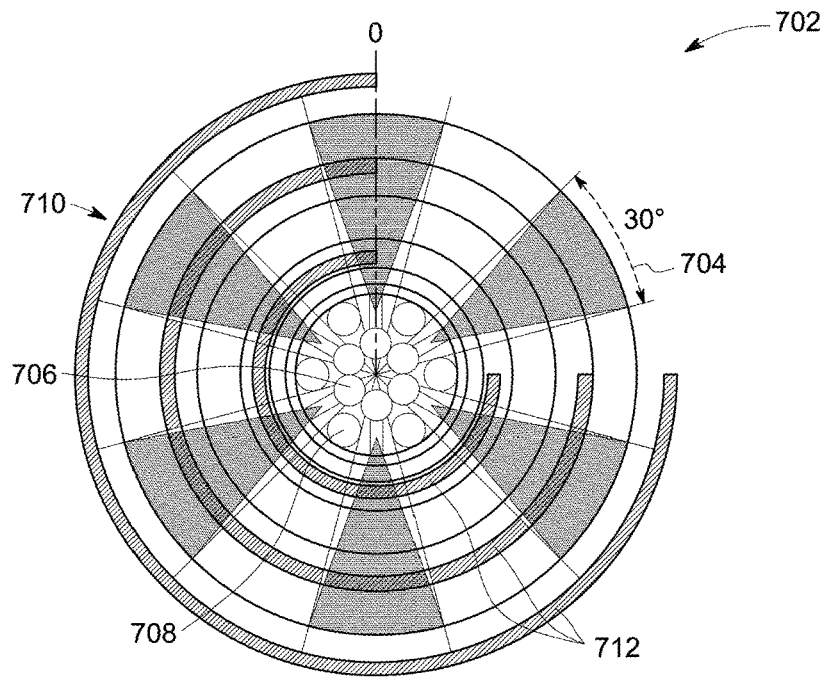
Figure 7B:
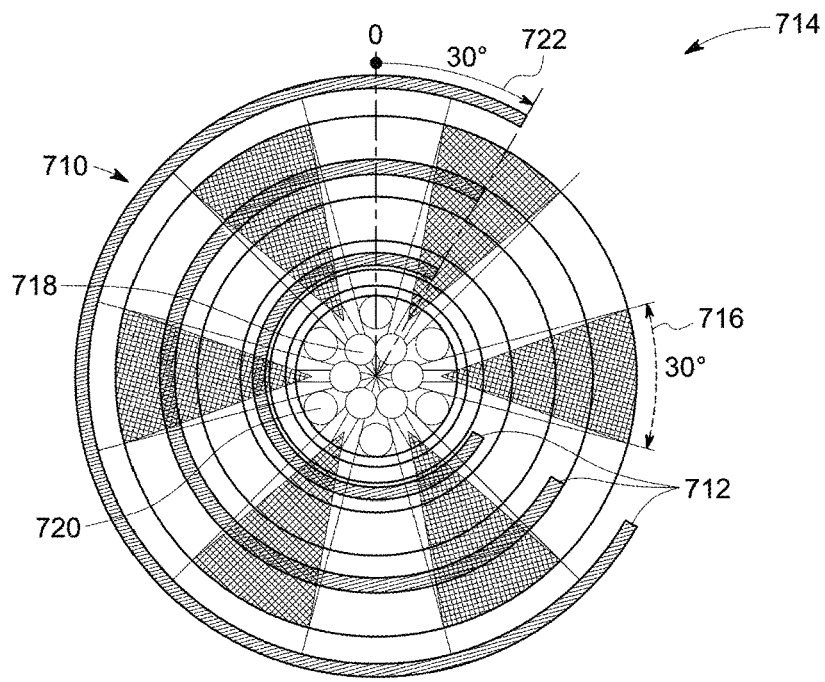
Figure 7C:
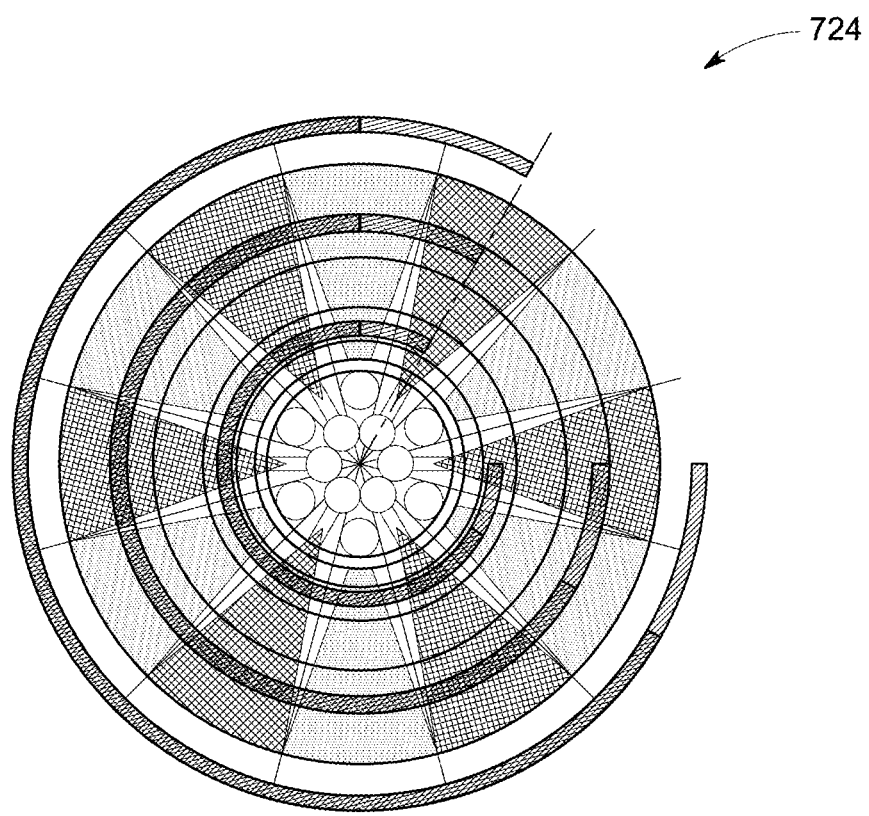
Figure 8:
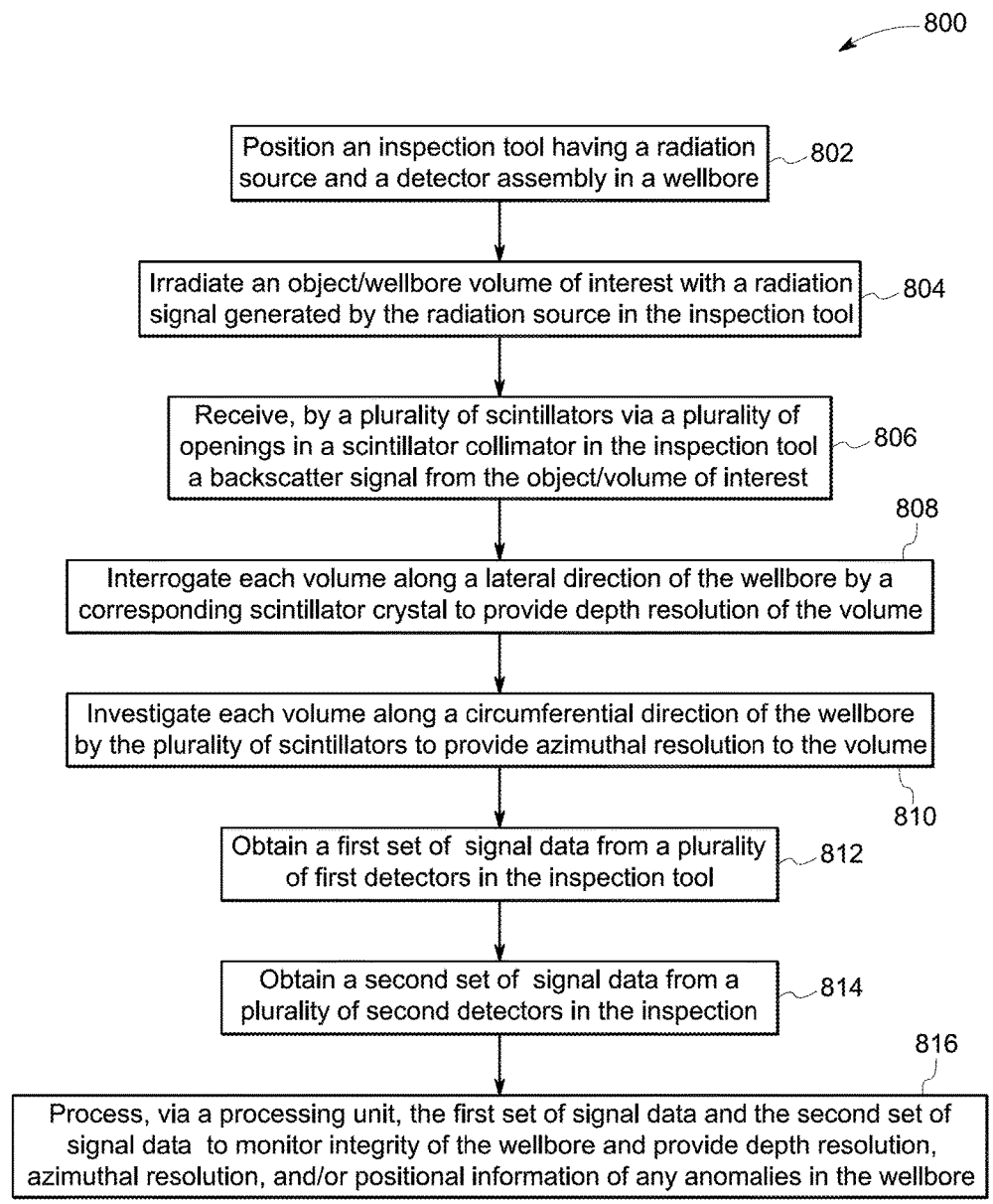
Figure 9:
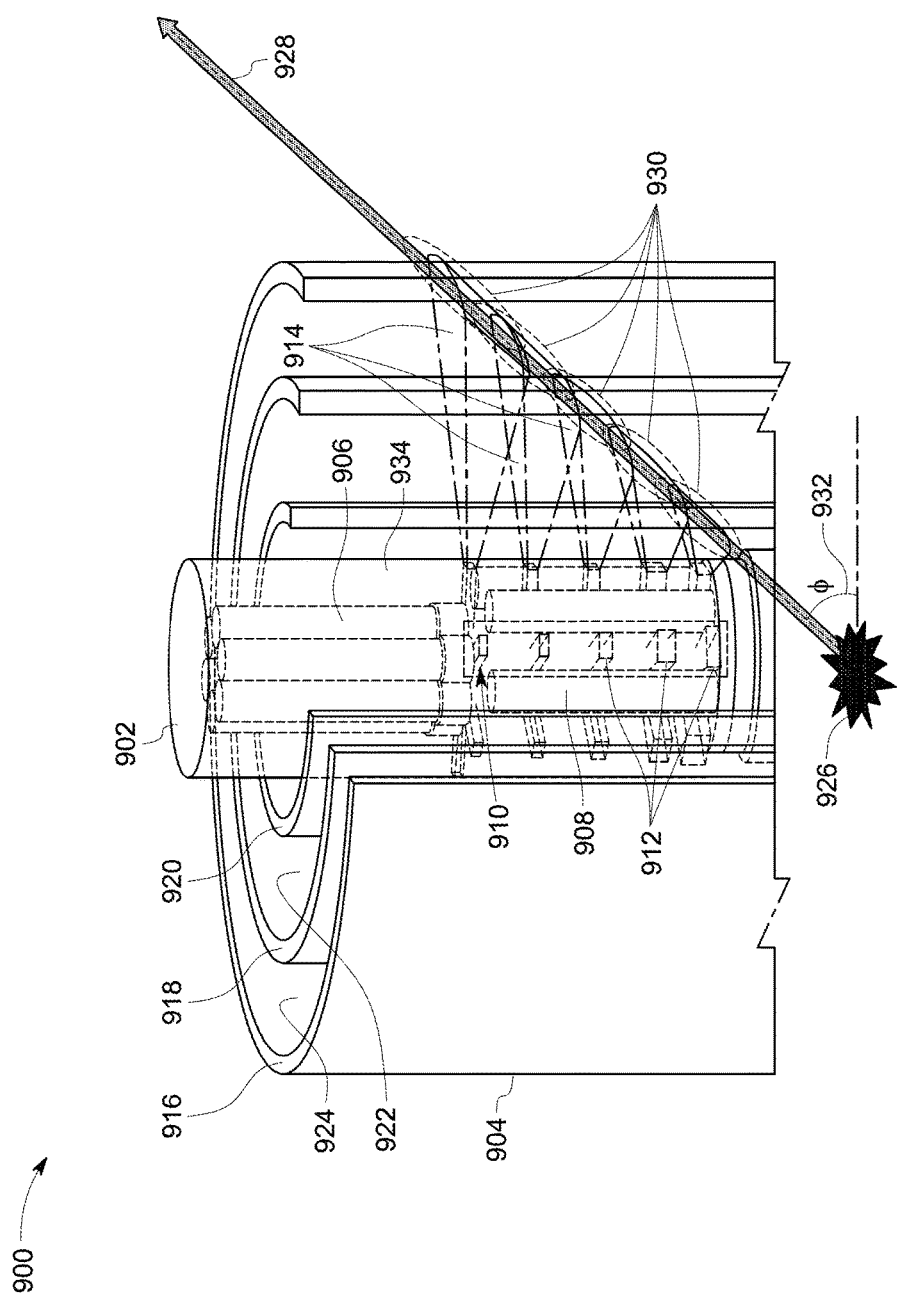
Figure 10:
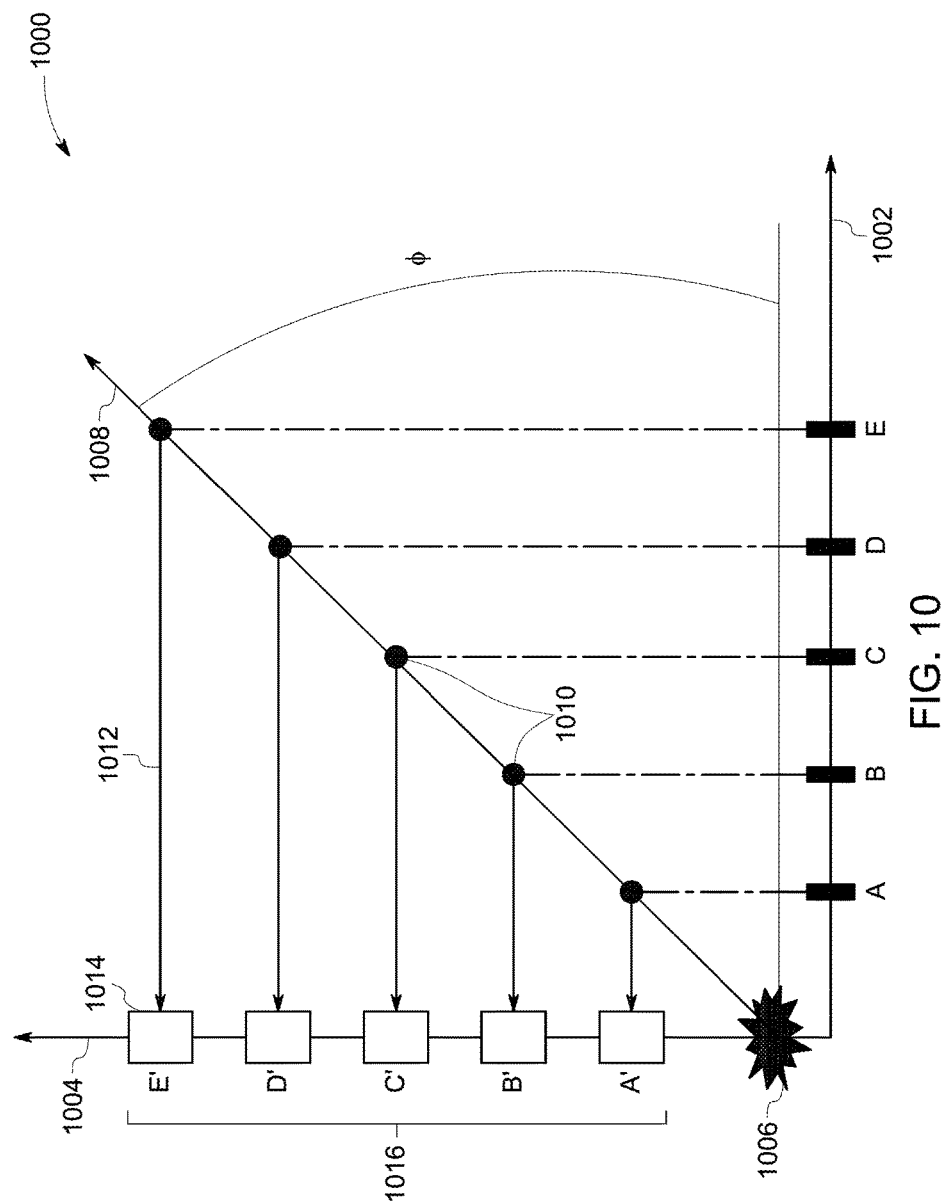
Figure 11:
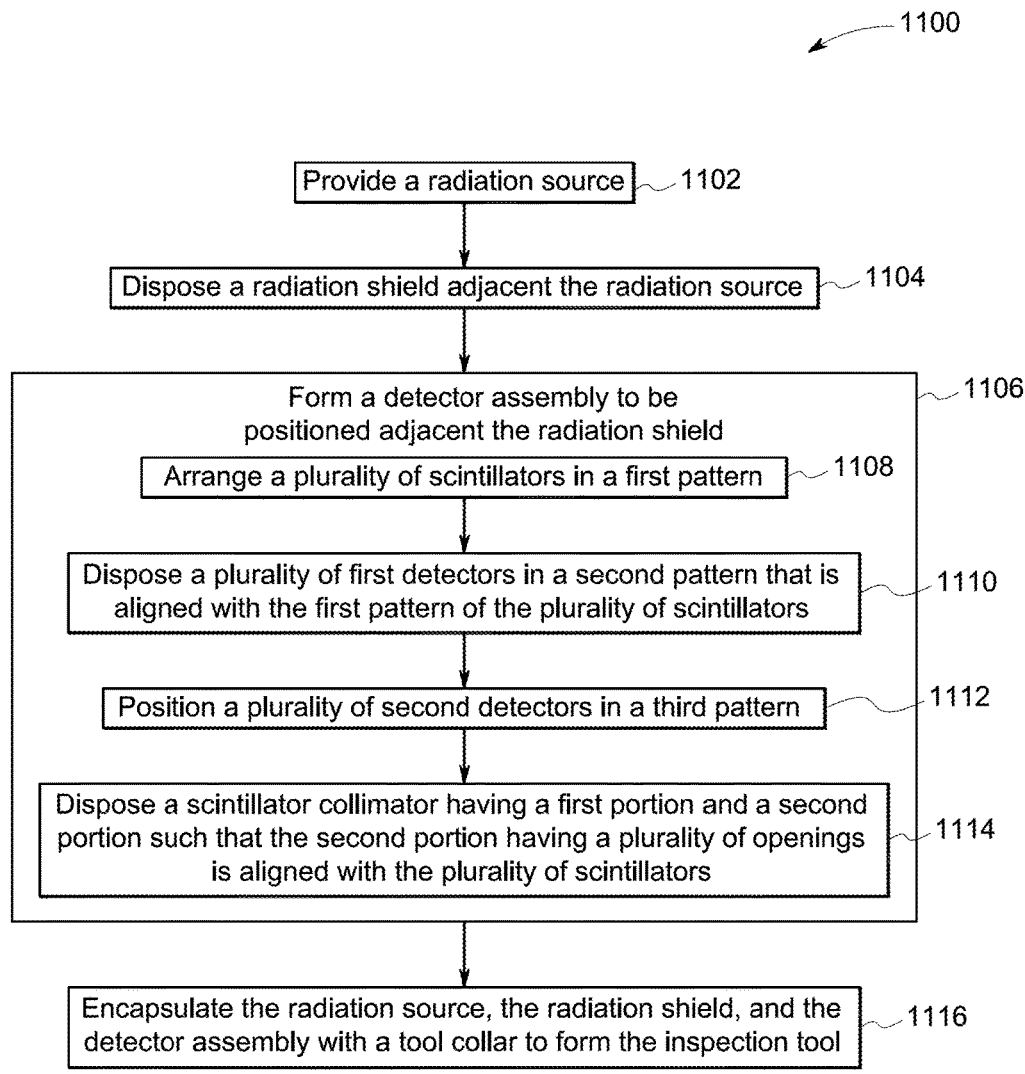

FIGS. 7(a)-7(c) are diagrammatical representations of a method for forming another embodiment of a detector assembly for use in the inspection tool of FIG. 2, in accordance with aspects of the present specification;

FIG. 8 is a flow chart illustrating an exemplary method for monitoring the integrity of the wellbore using the inspection tool of FIG. 2, in accordance with aspects of the present specification;

FIG. 9 is a diagrammatic illustration depicting the exemplary method for monitoring the integrity of the wellbore of FIG. 8, in accordance with aspects of the present specification;

FIG. 10 is a diagrammatic illustration that depicts providing depth resolution via use of the detector assembly of FIG. 2, in accordance with aspects of the present specification; and FIG. 11 is a flow chart depicting an exemplary method for forming the inspection tool of FIG. 2, in accordance with aspects of the present specification.

DETAILED DESCRIPTION

As will be described in detail hereinafter, various embodiments of a system and method for monitoring integrity of a wellbore are presented. The systems and methods presented herein entail use of an inspection tool having an exemplary detector assembly that facilitates the inspection of the integrity of multi-casing wellbores and advantageously allow inspection of defects well past the first cement/annulus interface in the multi-casing wellbore. It may be noted that the term multi-casing wellbore is used to represent wellbores having multiple casings and annuli. Additionally, the detector assembly provides azimuthal resolution as well as depth resolution in the monitoring of the wellbore. Moreover, the compact design of the inspection tool allows for operation in small wellbores.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

Figure 1:
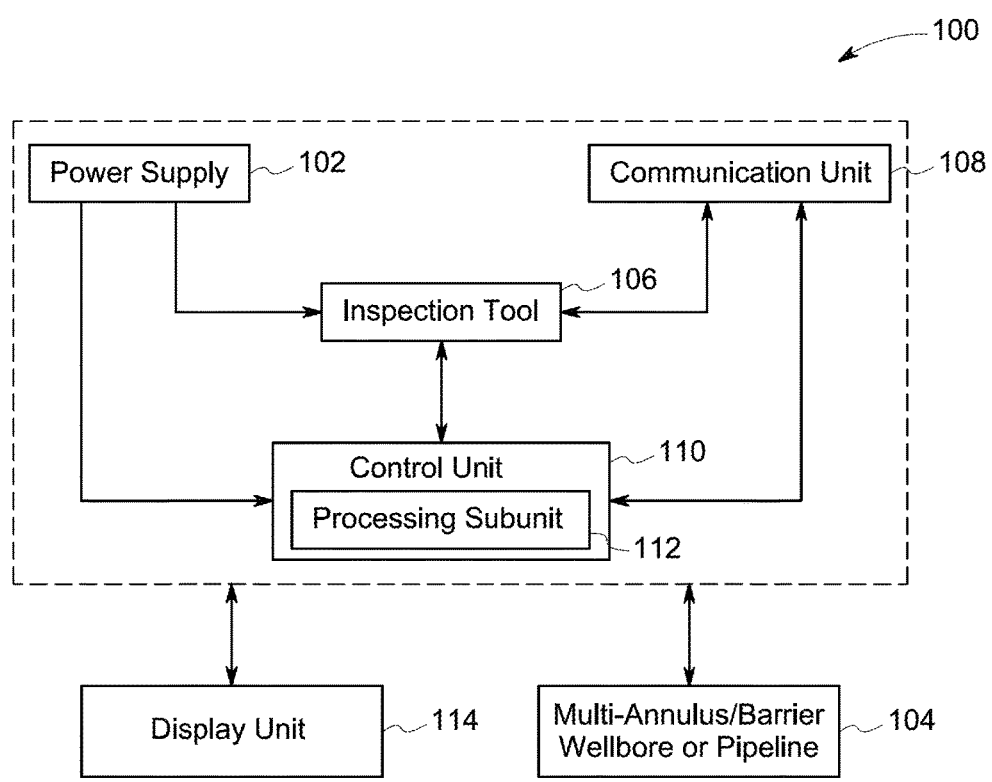
FIG. 1 is a diagrammatical representation of an exemplary system for monitoring an integrity of a wellbore, in accordance with aspects of the present specification.

Turning now to the drawings, by way of example in FIG. 1, an exemplary embodiment of a system 100 for monitoring a wellbore, in accordance with aspects of the present specification, is depicted. It may be noted that the wellbore may be a part of a hydrocarbon producing well, an onshore well, a subsea or offshore well, a gas well, a conventional well, an unconventional well, a pipeline, and the like. In one embodiment, the system 100 for monitoring the wellbore may include a power supply 102 and an inspection tool 106. The system 100 may also include a communication unit 108 and a control unit 110. The power supply 102 may include a battery, a direct current source, an alternating current source, and the like. Furthermore, the power supply 102 may be operatively coupled to the inspection tool 106 and may be configured to supply power to the inspection tool 106. In one non-limiting example, the control unit 110 may be a subsea control module (SCM). Although the embodiment of FIG. 1 depicts the communication unit 108 and the control unit 110 as separate units, in certain other embodiments, the control unit 110 may include the communication unit 108.

Furthermore, in one embodiment, the wellbore 104 may be a multi-barrier wellbore, a hydrocarbon producing well, an onshore well, a subsea or offshore well, a conventional well, an unconventional well, a pipeline, and the like. Also, in one example, the wellbore 104 may include a production tubing, an inner annulus (annulus A), an outer annulus (annulus B) with one or more casings sandwiched between the inner annulus and the outer annulus. Accordingly, the wellbore 104 may include multiple casings and annuli. In one example, the outermost annulus may be terminated by the wellbore surroundings, such as the rock formation. In one example, the casing wall(s) may be made of a high strength steel alloy. Moreover, the inner annulus may be co-axial to the production tubing and positioned exterior to the production tubing. Further, the outer annulus may be co-axial to the inner annulus and positioned exterior to the inner annulus.

Moreover, in one embodiment, the inspection tool 106 may be disposed in the wellbore 104 and configured to monitor/inspect a condition of the wellbore 104. More particularly, the inspection tool 106 may be configured to inspect the integrity of the wellbore 104 by identifying presence of any anomalies in the wellbore 104. In accordance with aspects of the present specification, the inspection tool 106 is designed to operate in various environments and inspect the environment accordingly. Some non-limiting examples of the anomalies in the wellbore 104 include air voids, holes, cracks, pitting, rust, micro annuli, fluid channels, gas voids, and other structural flaws that may affect the integrity of the wellbore 104.

In accordance with aspects of the present specification, the inspection tool 106 includes a radiation source and a detector assembly (see FIG. 2). The radiation source is configured to generate radiation and direct the radiation towards an inspection volume of interest in an object. The inspection volume may include a surface of a metal casing or a volume of a cement annulus of the wellbore 104. It may be noted that the terms scatter object, object, and object of interest may be used interchangeably. Similarly, the terms inspection area, inspection volume, volume, and volume of interest may be used interchangeably. The radiation source may be X-ray radiation source, a gamma ray radiation source, and the like. In some other embodiments, the radiation source may include hybrid sources such as an electrically-powered X-ray source or particle beam generator.

In one embodiment, the detector assembly includes a plurality of scintillators configured to generate a light signal in response to an impinging radiation signal from the volume of interest in the object such as a surface of the production tubing or any volume between a metal casing and the cement annuli of the wellbore 104. Also, in certain embodiments, the detector assembly may include direct-conversion radiation detectors to detect the backscatter X-ray signal. It may be noted that the impinging radiation signal may be a backscatter X-ray signal. The terms backscatter X-ray signal and backscatter signal may be used interchangeably.

Also, the plurality of scintillators is arranged in a first pattern. In one embodiment, the scintillators may be arranged in a circular pattern. It may be noted that the terms scintillator, scintillator unit, scintillator crystal stack, scintillator stack, and scintillator assembly may be used interchangeably.

Furthermore, the detector assembly includes a plurality of first detectors. Each first detector is operatively coupled to a corresponding scintillator. In addition, the plurality of first detectors is arranged in a second pattern, where the second pattern of the first detectors is aligned with the first pattern of the scintillators. Additionally, the detector assembly includes a plurality of second detectors, where each second detector is optically coupled to a corresponding scintillator. Also, the plurality of second detectors is arranged in a third pattern. In certain embodiments, the third pattern of the second detectors is configured to surround at least a portion of the first pattern of the scintillators. It may be noted that the terms detector and detector element(s) may be used interchangeably.

In some embodiments, the detector assembly may include one or more light guides that are configured to optically couple each scintillator to a corresponding second detector. The light guides are configured to guide a portion of the light signal from the scintillator to the corresponding second detector.

Moreover, the detector assembly may also include a scintillator collimator that is configured to selectively attenuate/receive the backscatter signal. In certain embodiments, the scintillator collimator is disposed around the scintillators. Further, the scintillator collimator includes a first portion that is opaque to the backscatter signal. Additionally, the scintillator collimator includes a second portion that includes a plurality of openings that is transparent to the backscatter signal. The inspection tool 106 will be described in greater detail with reference to FIGS. 2-11.

In addition, the communication unit 108 may be operatively coupled to the inspection tool 106. The communication unit 108 may be configured to transmit and/or receive information from the inspection tool 106. In one non-limiting example, the communication unit 108 may be disposed at a remote location. In another example, the communication unit 108 may be placed on or about wellbore 104. Also, the communication unit 108 may include electronic circuitry such as a transmitter, a receiver, and the like. In one example, a transmitter of the communication unit 108 may be disposed on or about the wellbore 104 and a receiver of the communication unit 108 may be disposed at a remote location. Furthermore, the power supply 102 and the communication unit 108 may be operatively coupled to the inspection tool 106 using a wired connection, a wireless connection, and the like. It may be noted that in certain embodiments, the power supply 102 may be an integral part of the inspection tool 106, while in other embodiments, the power supply 102 may be disposed at a location that is remote from the inspection tool 106.

Also, the control unit 110 may be operatively coupled to the communication unit 108 and/or the inspection tool 106. Any information/data from the inspection tool 106 may be communicated from the inspection tool 106 to the control unit 110 via use of the communication unit 108. The data communicated from the inspection tool 106 may include electrical signals generated by the detectors in response to respective portions of the light signal received from the scintillators. Additionally, the inspection tool 106 may also be configured to generate and transmit positional data to the control unit 110. Other examples of data communicated from the inspection tool 106 may include defect type, defect size, azimuthal, positional, and depth information about any defects/structural flaws in the wellbore 104, detector count rates, ratio of count rates between detectors, and the like. The detector count rates may be representative of rates of photons detected by the first and second detectors.

In one embodiment, the control unit 110 may include a processing subunit 112. The processing subunit 112 may include at least one processor configured to process received data. Further, the processing subunit 112 may be configured to analyze the data generated by the inspection tool 106. Furthermore, the processing unit 112 may be configured to identify a defect/structural flaw in one or more components of the wellbore 104 based on an analysis of the data. It may be noted that in certain embodiments, a processing subunit 112 may also be disposed within the inspection tool 106. Some non-limiting examples of faults in one or more components of wellbore 104 may include a defect or an anomaly in a casing wall, the cement annuli in the wellbore 104, the production tubing, a tubing hanger, the metal casing-cement annuli interface, or other wellbore structures. More specifically, the system 100 is configured to detect defects beyond the first metal casing/cement annulus interface.

In addition, based on the identification of fault, the control unit 110 may be configured to communicate the identified fault to the communication unit 108 and/or a user. Information related to the identified fault may be used to take any desired/appropriate corrective action. Moreover, in certain embodiments, based on the identification of any anomaly in the data that is indicative of a possible defect/flaw in the wellbore, casings and/or the cement annuli, the control unit 110 may be configured to communicate the identified anomaly in the data to the communication unit 108 and/or a user. Subsequently, this data may be combined or fused with data related to other anomalies, thereby providing an integrated wellbore defect identification.

In one embodiment, the inspection tool 106 may be a wire-line tool. Accordingly, in this example the wire-line tool (inspection tool 106) is introduced into the center of the production tubing. Once the wire-line tool is introduced into the production tubing, the inspection tool 106 may be configured to monitor/inspect the wellbore structures for presence of any defects/structural flaws during a logging operation by moving the inspection tool with the detector assembly along a wellbore axis. For example, the wire-line tool may be introduced into the production tubing for inspecting the production tubing, the wellbore casings, casing-to-cement interfaces, and the cement annuli of the wellbore 104. The inspection tool 106 may use wired coupling, wireless coupling, electrical coupling, magnetic coupling, radio communication, software based communication, or combinations thereof.

In certain embodiments, the system 100 may also include a display unit 114. In other embodiments, the system 100 may be communicatively coupled to the display unit 114. The system 100 may be configured to visualize the identified anomaly, positional information corresponding to the identified anomaly, signal data from the detectors, and the like on the display unit 114.

The robust design of the inspection tool 106 that employs multiple scintillator stacks assembled in a determined pattern provide depth and azimuthal resolution. The exemplary inspection tool facilitates inspection of the entire wellbore during a logging operation by moving the inspection probe with detector assembly along the wellbore axis. Additionally, the inspection tool allows inspection of defects in multi-casing/annulus wellbores well past the first casing cement annulus interface.

Turning now to FIG. 2, one embodiment 200 of an inspection tool configured to monitor integrity of a wellbore is depicted. The inspection tool 200 may be representative of one embodiment of the inspection tool 106 (see FIG. 1). The inspection tool 200 includes a radiation source 202 configured to generate radiation. The radiation source 202 may be an X-ray radiation source, a gamma ray (γ) radiation source, and the like. In some embodiments, the radiation source 202 may include hybrid sources such as an electrically-powered X-ray source or particle beam generator. For ease of explanation, in the example of FIG. 2, the radiation source 202 is an X-ray radiation source. The X-ray radiation source 202 is configured to generate an X-ray source beam 204 and transmit the X-ray source beam 204 in multiple directions. As depicted in the example of FIG. 2, the X-ray source beam 204 may be directed towards an object of interest. It may be noted that in one example, an inspection volume or volume of interest in the object may be generally represented by reference numeral 206. Also, reference numeral 208 is generally representative of a backscatter X-ray signal/beam that is generated when the X-ray source beam 204 impinges on the object 206.

As previously noted, the inspection tool 200 may be positioned/lowered into the production tubing of a wellbore to inspect the integrity of the wellbore. Accordingly, in this example, the volume of interest 206 may be in the object of interest such as the production tubing, the casings, the casing/cement annuli interface, the wellbore annuli, and other wellbore structures. Also, in this example, the inspection tool 200 is configured to monitor the integrity of the wellbore by identifying presence of defects/anomalies in the wellbore structures beyond the first metal casing-cement annulus interface.

Furthermore, the inspection tool 200 includes an exemplary detector assembly 210. The detector assembly 210 includes a plurality of scintillators (see FIG. 3), where each scintillator has a corresponding first end and a second end. Each scintillator is configured to receive the backscatter signal 208 and generate a light signal in response to the impinging backscatter signal 208. Moreover, each scintillator in the plurality of scintillators includes a scintillator stack. In one embodiment, the scintillator stack includes a single scintillator crystal. In another embodiment, the scintillator stack may include a plurality of scintillator crystals. Also, in yet another embodiment, the scintillator stack includes an alternating arrangement of a scintillator crystals and spacers. The spacers may be formed using glass or other light-transparent materials, in certain embodiments. Also, the scintillator crystals and the spacers may be made from various materials and may have different physical dimensions. In particular, the scintillator crystals and the spacers may be formed using different materials and may have different physical dimensions.

Figure 3:
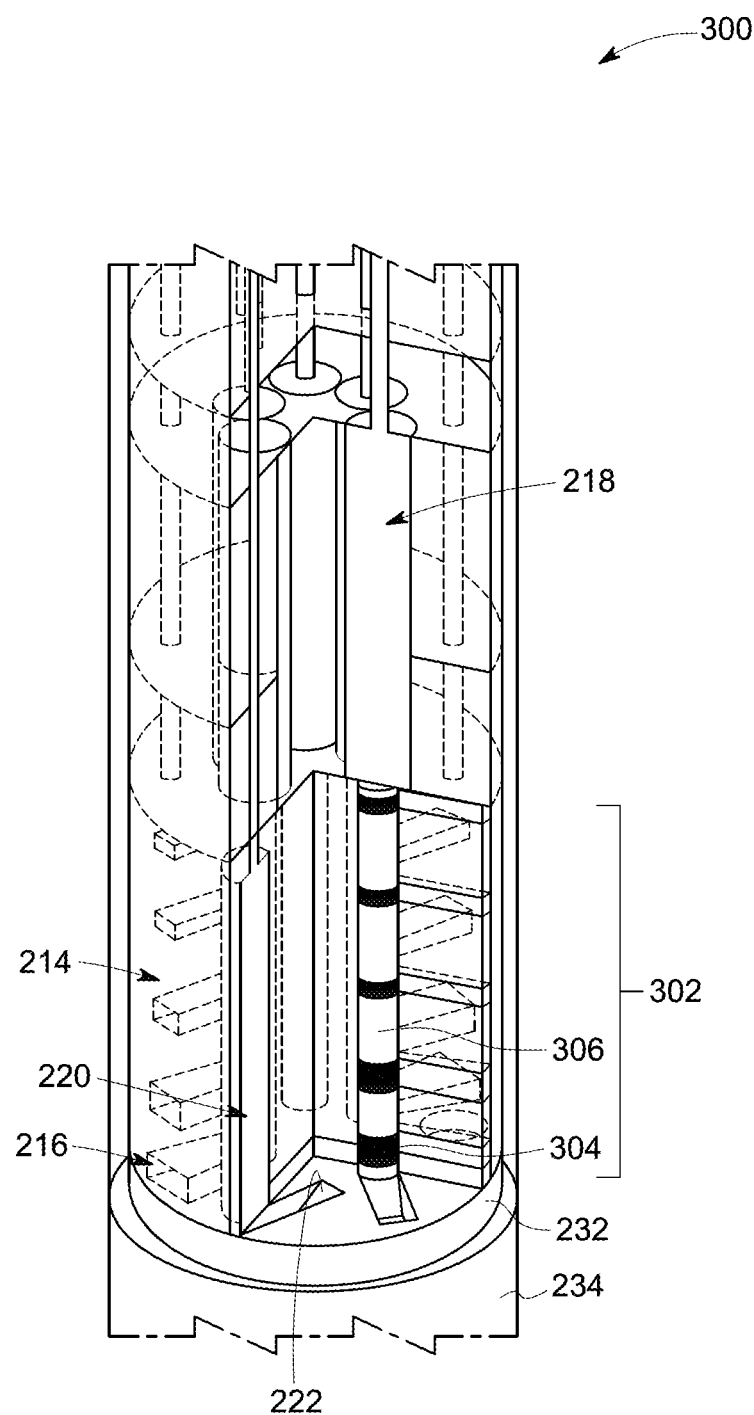
FIG. 3 is a diagrammatical representation of a cut-out view of a portion of the detector assembly of FIG. 2, in accordance with aspects of the present specification.
Figure 4:
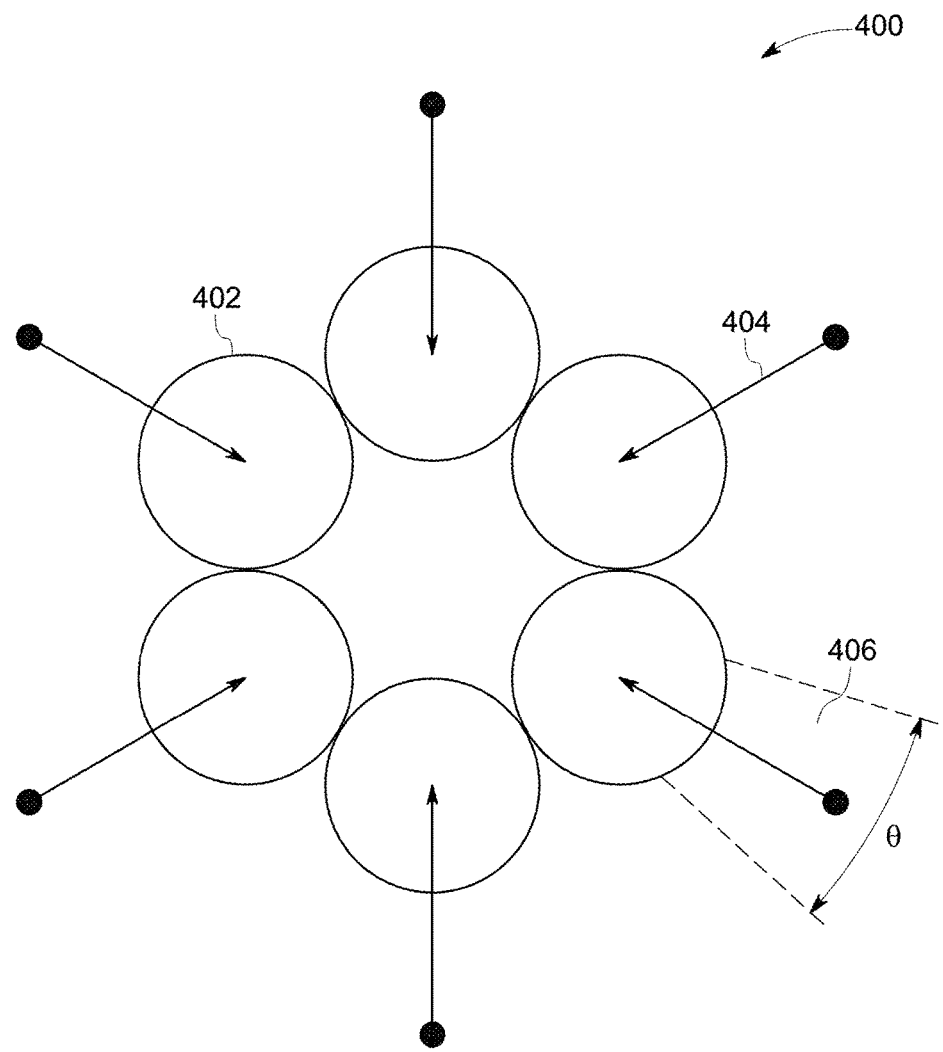
FIG. 4 is a diagrammatical representation of a top view of a scintillator unit in the detector assembly of FIG. 2, in accordance with aspects of the present specification.

In accordance with aspects of the present specification, the plurality of scintillators is arranged in a first pattern (see FIG. 4). In one embodiment, the scintillators may be arranged in a circular pattern around a central axis 236 of the detector assembly 210 or the inspection tool 200. It may be noted that in certain other embodiments, direct conversion detector elements may be used instead of the scintillators to convert the high-energy backscatter signal 208 to a low-energy light signal. However, in the example that employs scintillators, a photodetector element, such as a photomultiplier tube (PMT), may be used to detect the low-energy light signal. The arrangement of the scintillators will be described in greater detail with reference to FIGS. 3 and 5.

Moreover, the detector assembly 210 includes a plurality of first detectors 218 that is disposed adjacent the scintillators. Each first detector 218 is operatively coupled to a first end of a corresponding scintillator. Moreover, each first detector 218 is configured to receive a first portion of a light signal generated by the corresponding scintillator. In addition, the plurality of first detectors 218 is arranged in a second pattern (see FIG. 4), where the second pattern of the first detectors 218 is aligned with the first pattern of the scintillators. By way of example, the second pattern may include a circular pattern that is aligned with or matches the circular pattern of the plurality of scintillators. In this example, the first detectors 218 are disposed in a circular pattern around the central axis 236 of the detector assembly 210.

Furthermore, the detector assembly 210 includes a plurality of second detectors 220. Additionally, each second detector 220 is optically coupled to a second end of a corresponding scintillator. Also, each second detector 220 is configured to receive a second portion of the light signal from the corresponding scintillator. Moreover, the plurality of second detectors 220 may be arranged in a third pattern (see FIG. 4). In certain embodiments, the third pattern of the second detectors 220 is configured to surround the first pattern of the scintillators. In one embodiment, the second detectors 220 may be arranged in a circular pattern such that the second detectors 220 surround/encompass the scintillators.

In one embodiment, the plurality of first detectors 218 and the plurality of second detectors 220 may be photomultiplier tubes (PMTs). These PMTs are configured to respectively convert the first and second portions of the light signal received from the scintillators into corresponding electrical signals.

In some embodiments, the detector assembly 210 may include one or more light guides 222 that are configured to optically couple the second end of each scintillator to a corresponding second detector 220. Some non-limiting examples of the light guide 222 include reflective surfaces, corner prisms, a right-angle prism reflector, and the like. The light guides 222 are configured to guide the second portion of the light signal from each scintillator to the corresponding second detector 220. More particularly, the light guide 222 is configured to receive the second portion of the light signal from a scintillator and redirect, guide, or "bend" the second portion of the light signal by a determined amount prior to conveying the second portion of the light signal to the corresponding second detector 220. In one embodiment, the light guides 222 may be configured to redirect/bend the light in a range from about 150 degrees to about 210 degrees. By way of a non-limiting example, each light guide 222 may be configured to bend the light signal by about 180 degrees prior to conveying the light signal to the second detector 220. This arrangement allows the plurality of second detectors 220 to be disposed adjacent to the plurality of scintillators. Also, this design reduces a path length between the radiation source 202, the scintillators, and the corresponding detectors 218, 220 in the detector assembly 210, thereby providing a compact design of the detector assembly 210 in the inspection tool 200.

In certain embodiments, a scintillator collimator 214 is disposed around the plurality of scintillators and configured to selectively receive/attenuate the impinging backscatter X-ray radiation signal 208. More particularly, the scintillator collimator 214 includes plurality of openings 216 that is configured to selectively receive one or more portions of the backscatter X-ray radiation signal 208 that correspond to one or more desired view directions. It may be noted that the scintillator collimator openings 216 are aligned with the scintillator crystals in the plurality of scintillators. Also, the scintillator collimator openings 216 are configured to define a field of view for each scintillator crystal in each scintillator assembly. Further, some portion of the scintillator collimator 214 may be formed using a high-density material such as tungsten, tungsten carbide, lead, and the like. The remaining portion such as the openings 216 in the scintillator collimator 214 may be formed using a low-density material or may include air.

Moreover, in accordance with aspects of the present specification, a height, a width, or a combination thereof of each opening 216 and a distance/pitch between adjacently disposed openings 216 in the scintillator collimator 214 decrease along a direction away from the radiation source 202. Also, in one embodiment, the height of each of the openings 216 in the scintillator collimator 214 is at least equal to or greater than a height of a corresponding scintillator crystal in the scintillator. The scintillator collimator 214 will be described in greater detail with reference to FIG. 6.

In addition, the detector assembly 210 also includes a detector housing 224 that is configured to house the scintillators, the first detectors 218, and the second detectors 220. In certain embodiments, the detector housing 224 is configured to surround at least the scintillators. In some embodiments, the detector housing 224 may also be configured to surround the first detectors 218, the second detectors 220, and the light guides 222. Furthermore, the detector housing 224 is generally configured to be opaque to the backscatter signal 208.

With continuing reference to FIG. 2, the inspection tool 200 includes a source radiation shield 232 configured to shield the detector assembly 210 from radiation generated by the radiation source 202. The source radiation shield 232 is disposed between the radiation source 202 and the detector assembly 210. Moreover, the inspection tool 200 also includes a tool collar 234 that encapsulates the inspection tool 200.

In accordance with further aspects of the present specification, the inspection tool 200 is configured to aid in determining presence of an anomaly in the wellbore based on intensities of the signal data received from the first and second detectors 218, 220. More particularly, the inspection tool 200 aids in identifying the presence or absence of an anomaly in the wellbore based on intensities of the signal data received from the first and second detectors 218, 220. A processing unit such as the processing subunit 112 of FIG. 1 may be configured to process the signal data received from the first and second detectors 218, 220 to facilitate detection of anomalies in the wellbore structures.

Additionally, the inspection tool 200 and the detector assembly 210 in particular provides depth resolution and azimuthal resolution corresponding to any identified defects/anomalies in the wellbore. In particular, the design of the scintillator collimator 214 around each scintillator crystal and the positioning of each scintillator stack results in the detector assembly 210 is configured to provide depth resolution as well as azimuthal resolution. More specifically, the backscatter signal 208 detected by each scintillator crystal provides information about any flaws in the multi-casing wellbores. In addition to depth and azimuthal defect resolution, the detector assembly 200 is also configured to provide information about a type of defect and size of the defect.

In particular, the processing subunit 112 may be configured to identify any variations in the intensities of the signal data received from the first and second detectors 218, 220. These variations in the signal data may be indicative of an anomaly or defect in the wellbore. By way of example, detector elements in the first and second detectors 218, 220 may be configured to monitor intensities of the backscatter signal 208 received from the scintillators. If the X-ray source beam 204 encounters an air void or any other defect in the volume of interest 206 in the object, there is a reduction in the count rates of the backscatter signal 208. Accordingly, the detector elements in the first and second detectors 218, 220 may be configured to monitor the backscatter X-ray radiation signal 208 for any drop/reduction in the count rates of the of the backscatter X-ray radiation signal 208 to identify presence of a defect in the volume of interest 206.

Moreover, the inspection tool 200 is configured to obtain/generate positional resolution/location of any identified anomalies in the wellbore. The identified anomalies may be localized in an azimuthal direction and a depth direction perpendicular to a long axis of the wellbore. To that end, a ratio of the detected count rates corresponding to the first and second detectors 218, 220 may be computed. This ratio of the detected count rates aids in identifying the portion of the scintillators activated by the backscatter X-ray radiation signal 208. Also, the arrangement of the scintillators, the first detectors 218, and the second detectors 220 in determined patterns is used to provide azimuthal as well as depth resolution for any identified defects. In particular, since each scintillator crystal is configured to inspect a different volume of the wellbore, azimuthal and depth resolution for detected defects may be obtained. Positional resolution is provided by logging the inspection tool 200 along the elongated axis of a wellbore. It may be noted that in certain embodiments, a processing unit 112 may be disposed within the inspection tool 200.

As previously noted, the inspection tool 200 is positioned in a wellbore to inspect and/or monitor the integrity of the wellbore. The working of the inspection tool 200 will be described in greater detail with reference to FIGS. 3-11.

FIG. 3 is a diagrammatical illustration of a cut out view 300 of a portion of the detector assembly 210 of FIG. 2. In particular, the cut-out view 300 is presented to show a plurality of scintillators in the detector assembly 210 of FIG. 2. FIG. 3 is described with reference to the components of FIG. 2.

As depicted in FIG. 3, the detector assembly 300 includes a plurality of scintillators 302. Each scintillator 302 may be assembled as a scintillator stack. In one embodiment, each scintillator stack 302 may include a single scintillator crystal 304. Further, in another embodiment, the scintillator stack 302 includes a plurality of scintillator crystals 304. In the example of FIG. 3, each scintillator stack 302 includes an alternating arrangement of a plurality of scintillator crystals 304 and spacers 306. In one embodiment, the spacers 306 may be formed using glass.

In one embodiment, each scintillator crystal 304 in each scintillator stack 302 may be interrogated individually by a detector or interrogated simultaneously by a first detector 218 and a second detector 220. In the example of the dual or simultaneous interrogation, a ratio of signal intensities corresponding to the first detector 218 and the second detector 220 aids in identifying a scintillator crystal 304 activated by the high-energy backscatter X-ray radiation signal 208. In particular, if a high intensity signal is received by the first detector 218 and a low-intensity signal is received by the second detector 220, it may be determined that a scintillator crystal 304 that is disposed closer to the first detector 218 is activated by the backscatter X-ray signal 208.

Additionally, the scintillator collimator 214 formed using high-density materials such as lead, tungsten, or tungsten carbide may be used to narrow down a field of view (FOV) for each scintillator crystal 304. It may be noted that the scintillator stacks 302 may be positioned in a determined pattern and the scintillator collimator 214 may be positioned around each scintillator stack 302 to form the detector assembly 300 that provides depth resolution as well as azimuthal resolution. In one example, multiple one-dimensional scintillator crystal stacks 302 may be assembled in a circular fashion around central axis 236 to provide a circumferential FOV that encompasses all azimuthal angles for the inspection tool 200. In one embodiment, the arrangement of the scintillator stacks 302 provides a 360-degree FOV for the inspection tool 200. This obviates the need for rotating the inspection tool to obtain azimuthal resolution.

Referring now to FIG. 4, a diagrammatical illustration of a top view 400 of an arrangement of a plurality of scintillator stacks 402 such as the scintillator stacks 302 of FIG. 3 is depicted. As previously noted, the plurality of scintillator stacks 302 is arranged in a first pattern. In the example depicted in FIG. 4, the scintillators 402 are arranged in a circular pattern around a central axis such as the central axis 236 (see FIG. 2) of the inspection tool 200.

Also, reference numeral 404 is generally representative of a backscatter signal such as the backscatter X-ray radiation signal 208 of FIG. 2. Moreover, a field of view (FOV) of each scintillator 402 is generally represented by reference numeral 406. In this example, the FOV 406 encompasses an angular region θ. Moreover, although the example of FIG. 4 depicts the use of six (6) scintillators 402, use of a greater or lower number of scintillators 402 is envisaged. This arrangement of the scintillators 402 aids in providing depth resolution and azimuthal resolution. It may be noted that other arrangements of the scintillator stacks 402 are also envisioned.

Figure 5:
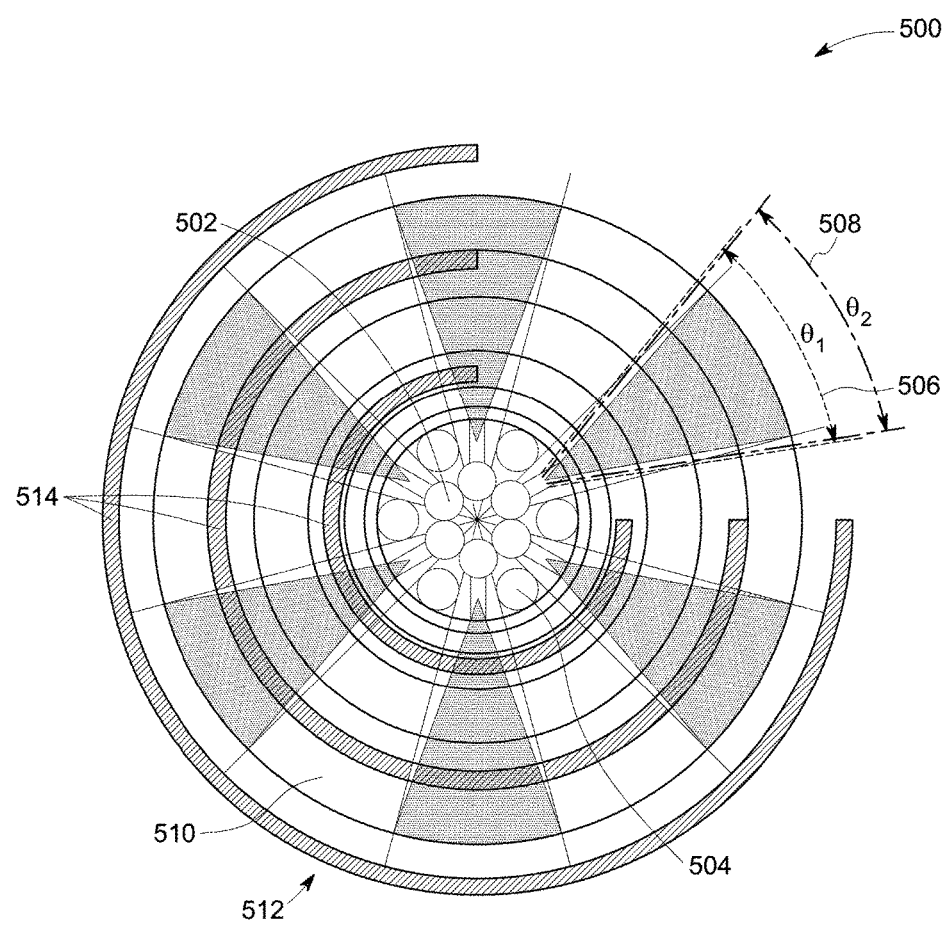
FIG. 5 is a diagrammatical representation of a top view of the detector assembly of FIG. 2 disposed in a multi-casing wellbore, in accordance with aspects of the present specification.

FIG. 5 is a diagrammatical illustration of a top view 500 of a detector assembly such as the detector assembly 210, 300 (see FIGS. 2-3). A plurality of first detectors 502 is arranged in a determined pattern. The first detectors 502 are representative of the first detectors 218 of FIG. 2. As previously noted, the first detectors 502 are arranged such that each first detector 502 is aligned with a corresponding scintillator such as the scintillator 402 of FIG. 4. In one embodiment, the determined pattern of the first detectors 502 may be a circular pattern that is aligned with or matches the circular pattern of the plurality of scintillators (see FIG. 4). In this example, the first detectors 502 are disposed in a circular pattern around a central axis such as the central axis 236 of the detector assembly 210 of FIG. 2. In the example depicted in FIG. 5 the first detectors 502 are arranged in a circular pattern.

Moreover, a plurality of second detectors 504 is arranged in a corresponding determined pattern. The second detectors 504 are representative of the second detectors 220 of FIG. 2. Further, in one embodiment, the second detectors 504 are arranged in a circular pattern. Additionally, in certain embodiments, the second detectors 504 are arranged such that the second detectors 504 at least partially surround the arrangement of the scintillators 402 (see FIG. 4). In FIG. 5, reference numeral 506 is generally representative of a first FOV (FOV1) of one scintillator crystal in a scintillator stack. In a similar fashion, reference numeral 508 is representative of a second FOV (FOV2) of another scintillator crystal in the same scintillator stack. It may be noted that the first FOV (FOV1) encompasses an angular region $θ_1$, while the second FOV (FOV2) encompasses an angular region $θ_2$. Furthermore, there is an overlap in the fields of view (FOVs) FOV1 and FOV2. It may be noted that although the example of FIG. 5 depicts the use of six (6) first detectors 502 and six (6) second detectors 504, use or a greater or lower number of first and/or second detectors 502, 504 is envisaged. Also, opaque areas where no radiation is detected are represented by reference numeral 510. It may be noted that the arrangement of the first and second detectors 502, 504 in an inspection tool is shown as being disposed in a wellbore 512. In the example depicted in the wellbore 512 has three concentric wellbore casings 514.

Although for ease of illustration the determined patterns corresponding to the scintillators 402 (see FIG. 4) and the first and second detectors 502, 504 (see FIG. 5) are depicted as circular patterns, use of patterns of other shapes, such as, but not limited to, square, rectangular, pentagonal, hexagonal, polygonal, or combinations thereof are envisaged.

Moreover, multiple scintillator crystal stacks may be assembled in a desired fashion such as a circular pattern to provide a continuous coverage in the azimuthal direction. In one example, the continuous coverage may be a 360-degree, uninterrupted coverage. Additionally, the design of collimators around each scintillator crystal and circular positioning of each scintillator stack results in a detector assembly that provides depth resolution as well as azimuthal resolution.

In accordance with aspects of the present specification, in order to seamlessly detect backscattered rays/signals in the depth direction as well as in the azimuthal direction, a scintillator collimator such as the scintillator collimator 214 (see FIG. 2) having collimator openings such as the scintillator collimator openings 216 are employed. More specifically, scintillator collimator openings having different widths, heights, and/or pitch are employed.

Figure 6:
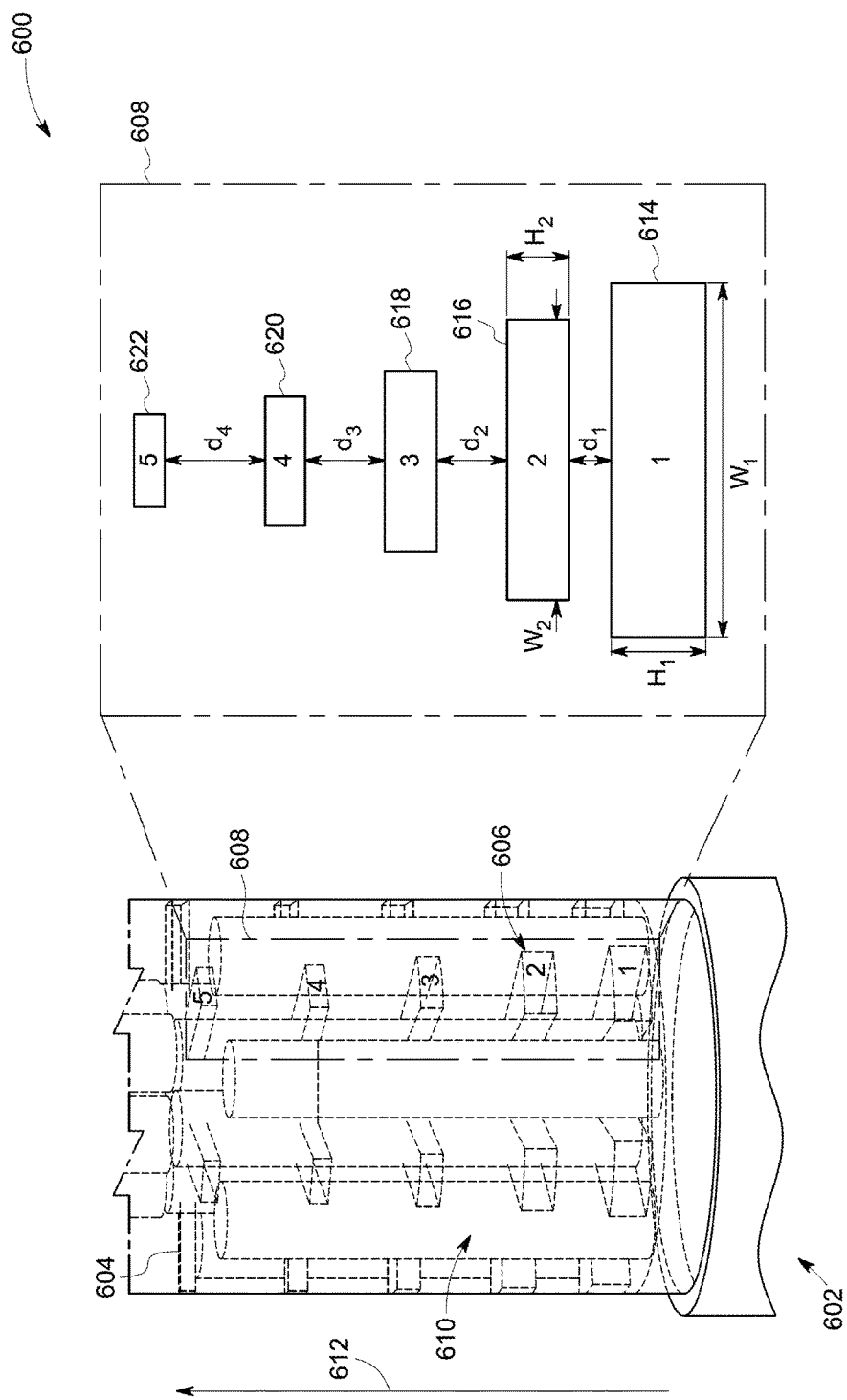
FIG. 6 is a diagrammatical representation of an exploded view of a scintillator collimator for use in the detector assembly of FIG. 2, in accordance with aspects of the present specification.

FIG. 6 is a diagrammatical representation 600 of a portion of a detector assembly 602 such as the detector assembly 210 of FIG. 2. More particularly, an exploded view of a portion 608 of a scintillator collimator 604 in the detector assembly 602 is illustrated in FIG. 6. Collimator openings in the scintillator collimator 604 are represented by reference numeral 606. Reference numeral 610 is representative of a second detector such as the second detector 220 of FIG. 2. Also, reference numeral 612 is representative of a direction away from a radiation source such as the radiation source 202 of FIG. 2.

In the example of FIG. 6, for ease of illustration, the portion 608 of the scintillator collimator 604 is depicted as including five (5) collimator openings 606. However, use of a greater or lower number of scintillator collimator openings 606 is envisioned. According to aspects of the present specification, the scintillator collimator openings 606 having different widths, heights, and/or pitch are employed. Reference numerals 614, 616, 618, 620, and 622 (614-622) are representative of a first scintillator collimator opening, a second scintillator collimator opening, a third scintillator collimator opening, a fourth scintillator collimator opening, and a fifth scintillator collimator opening, respectively.

As previously noted, the scintillator collimator 604 may be formed using a high-density material such as tungsten, tungsten carbide or lead and the openings 606, 614-622 in the scintillator collimator 604 may be formed using a low-density material or may include air. Further, a height, a width, or a combination thereof of each opening 614-622 and a distance/pitch between adjacently disposed openings 614-622 in the scintillator collimator 604 decrease along the direction 612 away from the radiation source. In addition, the height of each of the openings 614-622 in the scintillator collimator 604 is at least equal to or greater than a height of a corresponding scintillator crystal in the scintillator.

The first scintillator collimator opening 614 is disposed closest to the radiation source. Accordingly, the first scintillator collimator opening 614 is the largest in width $W_1$ and height $H_1$. Also, a pitch or distance $d_1$ to a neighboring scintillator collimator opening 616 is the smallest. For scintillator collimator openings 616-622 moving further away from the radiation source, the corresponding widths and heights decrease and the pitch between neighboring scintillator collimator openings increases, as depicted in FIG. 6. By way of example, if $W_1$, $W_2$, $W_3$, $W_4$, and $W_5$ correspond to the widths of the scintillator collimator openings 614-622 and $H_1$, $H_2$, $H_3$, $H_4$, and $H_5$ correspond to the heights of the scintillator collimator openings 614-622, then in accordance with aspects of the present specification:

$$W_1 > W_2 > W_3 > W_4 > W_5 \quad (1)$$

$$\text{and } H_1 > H_2 > H_3 > H_4 > H_5 \quad (2)$$

Similarly, if $d_1$, $d_2$, $d_3$, $d_4$, and $d_5$ correspond to the pitch/distance between neighboring scintillator collimator openings 614-622, then in accordance with aspects of the present specification:

$$d_1 < d_2 < d_3 < d_4 < d_5 \quad (3)$$

According to further aspects of the present specification, in order to achieve an uninterrupted 360-degree coverage in the azimuthal direction, multiple detector assemblies such as the detector assembly 210 that are shifted with respect to each other may be used to form a composite detector assembly. Turning now to FIGS. 7(a)-7(c), a diagrammatic illustration 700 of a method of forming a composite detector assembly configured to provide an uninterrupted 360-degree coverage is depicted.

FIG. 7(a) is a top view 702 of a first detector assembly such as the detector assembly 210 of FIG. 2. In this example, the first detector assembly 702 includes six scintillators stacks (not shown). Each scintillator stack covers a field of view angle 704 of 30 degrees. Reference numerals 706 and 708 are respectively representative of a plurality of first detectors and a plurality of second detectors in the first detector assembly 702. In the example of FIG. 7(a), six first detectors 706 and six second detectors 708 have been used. It may be noted that the first detector assembly 702 is shown in the context of a wellbore 710 having multiple casings 712.

Also, FIG. 7(b) is a top view 714 of a second detector assembly such as the detector assembly 210 of FIG. 2. The second detector assembly 714 also includes six scintillators or scintillators crystal stacks (not shown). Each scintillator stack covers a field of view angle 716 of 30 degrees. Reference numerals 718 and 720 are respectively representative of a plurality of first detectors and a plurality of second detectors. Also, in the example of FIG. 7(b), six first detectors 718 and six second detectors 720 have been used. The arrangement of the second detector assembly 714 is offset by a shift 722 of 30 degrees in comparison to the arrangement of the first detector assembly 702. It may be noted that the second detector assembly 714 is also shown in the context of the wellbore 710 having multiple casings 712.

One example embodiment of a composite detector assembly 720 configured to provide an uninterrupted 360-degree coverage is presented in FIG. 7(c). In particular, the first and second detector assemblies 702, 714 are combined to form the combined or composite detector assembly 724. Each of the six scintillator crystal stacks in the first detector assembly 702 covers a field of view angle of 30 degrees. Also, each of the six scintillator stacks in the second detector assembly 714 that are shifted by 30 degrees also provides a field of view angle of 30 degrees. Consequently, the combined detector assembly 724 provides an uninterrupted 360-degree coverage, as shown in FIG. 7(c). In order to achieve an uninterrupted 360-degree coverage in the azimuthal direction, multiple detector assemblies that are shifted with respect to each other may be used. Use of different arrangements of detector assemblies to obtain an uninterrupted 360-degree coverage is envisaged.

The composite detector assembly 724 is configured to provide an uninterrupted, continuous 360-degree coverage, as depicted in FIG. 7(c). The continuous 360-degree coverage may be provided in the azimuthal direction. In this example, a radiation source may be positioned between the two detector assemblies 702, 714. One application of the composite detector assembly 724 in integrity monitoring of a multi-casing wellbore is depicted in FIG. 9.

Referring now to FIG. 8, a flow chart 800 depicting a method for monitoring/inspecting integrity of a wellbore is presented. The method 800 is described with reference to the components of FIGS. 1-7.

The method 800 starts at step 802, where the inspection tool 200 is disposed in the wellbore 104. In one example, the inspection tool 200 may be disposed in a production tubing of the wellbore 104. Moreover, as indicated by step 804, the volume of interest 206 in the object is irradiated by the X-ray source beam 204 generated by the radiation source 202 of the inspection tool 200. As previously noted, a γ-ray source beam may also be used. In one example, the object may be a wall of the production tubing, the metal casings, the cement annuli, metal casing/cement annuli interfaces, or other wellbore structures. The backscatter signal 208 is generated when the radiation beam 204 strikes the volume of interest 206 in the object.

Further, at step 806, the scintillator stacks 302 receive the backscatter signal 208 via the plurality of openings 216 in the scintillator collimator 214. In particular, a field of view of each scintillator crystal 304 in the scintillator stacks 302 is narrowed via a corresponding opening 216 in the scintillator collimator 214.

As previously noted with reference to FIG. 6, a height, a width, or a combination thereof of each opening 614-622 and a distance/pitch between adjacently disposed openings 614-622 in the scintillator collimator 604 decrease along the direction 612 away from the radiation source 202. Also, the height of each of the openings 614-622 in the scintillator collimator 604 is at least equal to or greater than a height of a corresponding scintillator crystal 304 in the scintillator stack 302. Hence, by careful design of the scintillator collimator openings 614-622, the field of view of the scintillator crystals 304 in each scintillator stack 302 may be controlled.

Additionally, as indicated by step 808, each volume of the wellbore 104 along a lateral direction is interrogated by a corresponding scintillator crystal 304 in the scintillator stack 302 to provide depth resolution of the interrogated volume. Moreover, at step 810, each volume along a circumferential direction of the wellbore 104 is investigated by the plurality of scintillators stacks 302 to provide azimuthal resolution of the volume. More particularly, depth resolution, azimuthal resolution, and positional information of a volume along the wellbore length that may or may not contain a defect/structural flaw are provided as the inspection tool 200 is lowered into the wellbore. Steps 808-810 will be described in greater detail with reference to FIGS. 9-10.

Also, the scintillator stacks 302 generate a light signal in response to an impinging backscatter signal 208. A first portion of the light signal is directed towards the first detectors 218 and a second portion of the light signal towards the second detectors 220. In certain embodiments, the second portion of the light signal is directed from the scintillator stacks 302 towards the second detectors 220 via use of the light guides 222, such as a right-angle prism reflector. More particularly, directing the second portion of the light signal entails bending the second portion of the light signal by a determined amount via use of the light guides 222 and guiding the bent light signal to the second detectors 220.

As will be appreciated, the first and second detectors 218, 220 respectively generate sets of signal data such as electrical signals in response to the first and second portions of light received from the scintillator stacks 302. A first set of signal data is acquired from the first detectors 218, as indicated by step 812. In a similar fashion, as indicated by step 814, a second set of signal data is acquired from the second detectors 220. In one embodiment, the processing subunit 112 may be configured to acquire the first and second sets of signal data from the first and second detectors 218, 220 in the detector assembly 210.

Furthermore, the processing subunit 112 may be configured to process/analyze the first and second sets of signal data to monitor a condition of the wellbore 104, as depicted by step 816. In particular, the processing subunit 112 may be configured to analyze the first and second sets of signal data to identify presence of any discrepancy/variation in the first and second sets of signal data. By way of example, in one embodiment, the processing subunit 112 may be configured to determine an intensity of the first set of signal data, an intensity of the second set of signal data, or a combination thereof. Additionally, the processing subunit 112 may be configured to identify a presence of an anomaly in the wellbore 104 based on the intensity of the first set of signal data, the intensity of the second set of signal data, counts rates in first and second detectors, or combinations thereof. More particularly, presence of any discrepancies/variations in the first and second sets of signal data and/or the detector count rates may be indicative of an anomaly/defect in the wellbore structures. By way of example, total backscatter counts from each volume may be used to identify presence of any defects/anomalies. Backscatter counts may also be used to identify the type of defect and the defect size.

In accordance with further aspects of the present specification, the processing subunit 112 may also be configured to determine an intensity ratio based on corresponding signals received from the first and second detectors 218, 220. This intensity ratio may be used to identify the scintillator crystal 304 that received the high-energy backscatter signal 208. Further, based on the identified scintillator crystal, an inspection volume in the lateral direction may be identified.

Additionally, the processing subunit 112 may also be configured to determine a location/position of any identified anomaly if the presence of an anomaly is identified. By way of example, the processing subunit 112 is configured to identify a detector element in the first detectors 218 and/or the second detector 220 corresponding to the signal data having the variations. Positional information corresponding to that detector element may be obtained by the processing subunit 112. This information may be used to identify the location of the anomalies in the production tubing 202.

Use of the method 800 aids in inspecting/monitoring the integrity of the wellbore 104 without having to extract the production tubing out of the wellbore. Additionally, the method provides azimuthal resolution and depth resolution to the interrogated volumes in the wellbore, thereby providing efficient identification of the location of any anomalies. If any flaws/defects are detected, the processing subunit 112 may be configured to extract information about defect type and defect size from the count rates. Moreover, in certain embodiments, one or more of information related to the condition of the wellbore, the first set of signal data, the second set of signal data, an identified anomaly/defect, or combinations thereof may be visualized on the display unit 114. It may be noted that the interrogated volumes both in the depth/lateral direction and the azimuthal direction may be combined to generate a three-dimensional (3D) image/map. More particularly, as the inspection tool 200 is moved along an axis of the wellbore 104, the entire wellbore 104 may be scanned and the 3D image may be created, where the 3D image provides depth and azimuthal resolutions of the inspection/detection volumes. The resolution is defined by the size of individual inspection volumes. Also, the 3D image provides a visual representation of any identified anomalies and may be visualized on the display unit 114.

Turning now to FIG. 9, a diagrammatical representation 900 of monitoring of the integrity of a multi-casing wellbore using the inspection tool 200 of FIG. 2 is presented. The monitoring of the integrity of a wellbore is described with reference to the components of FIG. 1-8.

More particularly, in FIG. 9, reference numeral 900 is used to depict the use of an inspection tool 902 to monitor a multi-casing wellbore 904. The inspection tool 902 includes a plurality of scintillators (not shown in FIG. 9), a plurality of first detectors 906, and a plurality of second detectors 908. Additionally, the inspection tool 902 includes a detector housing 934 and a scintillator collimator 910 having a plurality of scintillator collimator openings 912. As previously noted, these collimator openings 912 aid in defining fields of view (FOVs) for each scintillator crystal in each of the plurality of scintillator stacks. In FIG. 9, the FOVs for scintillator crystals in one scintillator are generally represented by reference numeral 914.

Furthermore, the wellbore 904 is a multi-casing wellbore. In the example of FIG. 9, for ease of illustration, the multi-casing wellbore 904 is shown as including a first wellbore casing 916, a second wellbore casing 918, and a third wellbore casing 920. It may be noted that the wellbore 904 may include any other number of casings. Also, in certain embodiments, a filler such as cement may be disposed between the casings 916, 918, 920 of the wellbore 904. Reference numeral 922 represents a first cement annulus disposed between the first and second wellbore casings 916, 918 and a second cement annulus that is disposed between the second and third wellbore casings 918, 920 is represented by reference numeral 924. In addition, the wellbore 904 may include an outer cement annulus that is disposed external to an outermost wellbore casing such as the third wellbore casing 920 and connects the wellbore 904 to rock formation.

Once the inspection tool 902 is positioned in the wellbore 904, a radiation source 926 in the inspection tool 902 is configured to generate an X-ray source beam 928. As depicted in FIG. 9, the X-ray source beam 928 encounters a plurality of objects along its path. By way of example, the objects encountered by the X-ray source beam 928 include the first casing 916, the first cement annulus 922, the second casing 918, the second cement annulus 924, and the third casing 920. Corresponding backscatter signals are generated when the X-ray source beam 928 strikes inspection volumes in the objects. These backscatter signals are captured by a corresponding scintillator crystal via a corresponding scintillator collimator opening 912. Moreover, as depicted in FIG. 9, detection volumes 930 corresponding to each scintillator collimator opening 912 are representative of an overlap of an X-ray source beam volume and a scintillator FOV 914.

It may be noted that the number of scintillator stacks in the inspection tool 902, the vertical spacing between the scintillator crystals in the scintillator stacks, and therefore the scintillator collimator openings 912, a distance between the X-ray radiation source 926 and the detectors 906, 908, and the angle of the source collimation passageway aid in determining a radial or depth resolution. Reference numeral 932 is representative of a source angle ϕ. In accordance with aspects of the present specification, different source angles ϕ 932 may be used to achieve the desired depth resolution. Use of a smaller source angle ϕ 932 results in a coarse depth resolution with the benefit of a deeper penetration depth. Similarly, use of a larger source angle ϕ 932 results in a fine depth resolution with a lower penetration depth. In particular, each scintillator stack having one or more scintillator crystals interrogate a volume 930 in the wellbore 904 that encompasses a determined depth range in the wellbore 904. These detection/inspection volumes 930 overlap, thereby providing a seamless interrogation along the length/depth of the wellbore 904. Accordingly, the inspection tool 902 provides depth resolution while inspecting the integrity of the wellbore 904. Additionally, the design of the inspection tool 902 aids in inspecting the integrity beyond the first casing 916 of the wellbore 904, thereby advantageously facilitating inspection across the wellbore structures.

Moreover, the arrangement of the detectors 906, 908, the scintillators and the corresponding scintillator openings 912 provide an azimuthal resolution to the inspection of the integrity of the wellbore 904. In particular, opening angles of the scintillator collimator openings 912, the scintillator stacks, and matching zones of illumination from the X-ray radiation source 926 provide the azimuthal resolution. It may be noted that the matching zones of illumination are provided by the X-ray radiation source 926 in conjunction with a masking effect provided by a source-side collimator. Consequently, the backscatter signal is only generated from material corresponding to the inspection volume that is illuminated by the X-ray source beam 928. Subsequently, the scintillators crystals in the scintillator stacks along with a masking effect of the scintillator collimator 910 are configured to receive the backscatter radiation from the illuminated zones. The intersection of the two sets of the detection/inspection volumes 930 provides the azimuthal resolution.

By way of example, in FIG. 9, use of six equally-spaced scintillator stacks and matching sets of detectors 906, 908, with equally-sized spaces therebetween filled with a collimating material that is relatively opaque to radiation, aids in achieving an azimuthal resolution of 30 degrees. It may be noted that finer azimuthal resolution may be achieved by using a larger number of scintillator stacks at the expense of scintillator element size.

In accordance with aspects of the present specification, opening angles of the scintillator collimator openings 912, the number of scintillators, the vertical spacing between the scintillator crystals in each scintillator, the matching scintillator collimator openings 912, and the location of the X-ray radiation source 926 with respect to at least a first scintillator offer an exemplary design of the detector assembly that provides depth resolution and azimuthal resolution for use in the inspection tool 902. More particularly, the inspection tool 902 is configured to generate depth as well as azimuthal information about potential defects/structural flaws in the wellbore 904.

Further, an intensity ratio generated by processing signals received from a first detector 906 and a second detector 908 associated with a given scintillator provides information about a scintillator crystal that is impinged by the high-energy backscatter radiation signal. Moreover, each vertically separated scintillator crystal in each scintillator stack interrogates a corresponding volume with different penetration depths. Also, each scintillator in the determined pattern/configuration corresponds to an angular region that is interrogated, thereby providing azimuthal resolution and depth resolution. It may be noted that the inspection tool 902 provides depth resolution and azimuthal resolution of an interrogated volume in the wellbore 904 that may or may not contain a defect/structural flaw.

Once all inspection/detection volumes corresponding to the depth/lateral direction and the azimuthal direction are obtained, the volumes may be combined to form a 3D image having depth and azimuthal resolution. Furthermore, as the inspection tool 902 is moved along the axis of the wellbore 904, the entire wellbore 902 may be scanned to monitor the integrity of the wellbore 904 to create a 3D image. The resolution of the 3D image is defined by the size of individual detection volumes 930. This 3D image provides a map of the wellbore 904 that shows any anomalies/flaws in the wellbore 902. Also, the 3D image has azimuthal and depth resolution.

FIG. 10 depicts one example 1000 of providing depth resolution. In FIG. 10, the X-axis 1002 is representative of a depth along a wellbore such as the wellbore 904 of FIG. 9. Also, the Y-axis 1004 is representative of a logging direction such as a wellbore axis. Reference numeral 1006 is representative of an X-ray radiation source, while an X-ray source beam generated by the X-ray radiation source is represented by reference numeral 1008. Moreover, volumes of interest in the objects encountered by the X-ray source beam 1006 are represented by reference numeral 1010. These volumes of interest or wellbore volumes may include various wellbore structures depicted in FIG. 9. It may be noted that the terms volume of interest, wellbore volume, and inspection volume may be used interchangeably.

Subsequent to the X-ray source beam 1008 striking the objects/volumes of interest 1010, corresponding backscatter X-ray radiation signals 1012 are generated. These backscatter X-ray radiation signals 1012 are detected by corresponding scintillator crystals 1014 in a scintillator stack 1016, thereby providing depth resolution for a given position of the inspection tool along the wellbore axis 1004.

Referring now to FIG. 11, a flowchart 1100 depicting a method for forming an inspection tool such as the inspection tool 200 of FIG. 2 is presented. The method 1100 is described with respect to the components of FIGS. 1-10.

At step 1102, the radiation source 202 is provided. The radiation source 202 may be an X-ray source or a gamma ray source. Additionally, at step 1104, the radiation source shield 232 is disposed adjacent to the radiation source 202. As previously noted, the radiation source shield 232 is configured to protect other components of the inspection tool 200 from the radiation generated by the radiation source 202.

Subsequently, the detector assembly 210 is positioned adjacent the radiation source shield 232, as indicated by step 1106. It may be noted that step 1106 further includes forming the detector assembly 210. Forming the detector assembly 210 includes arranging a plurality of scintillators 302, 402 in a first pattern, as indicated by step 1108. Additionally, at step 1108, a plurality of first detectors 218 is arranged in a second pattern that is aligned with the first pattern of the plurality of scintillators 302, 402.

Furthermore, at step 1110, a plurality of second detectors 220 is arranged in a third pattern. In certain embodiments, second ends of the scintillators 402 may be optically coupled to corresponding second detectors 220 via light guides 222. Additionally, at step 1112, the scintillator collimator 214 is disposed around the arrangement of the scintillators 302, 402, the first and second detectors 218, 220 to form the detector assembly 210. In particular, the scintillator collimator 214 is disposed such that the scintillator collimator openings 216 are aligned with the scintillator crystals 304 in the scintillator stacks 302. Moreover, at step 1114, the radiation source 202, the radiation source shield 232, and the detector assembly 210 are encapsulated with the tool collar 234 to form the inspection tool 200.

Various embodiments of methods and systems for monitoring a wellbore are presented. In particular, the systems and methods presented hereinabove provide an inspection tool for monitoring the integrity of the wellbore. The inspection tool employs multiple scintillator stacks that are assembled in a determined pattern such as a circular pattern to provide depth and azimuthal resolution. Furthermore, the use of the scintillator collimator allows for interrogation of small wellbore volumes resulting in an improved signal-to-noise ratio (SNR) compared to detection without use of collimating structures. Additionally, the FOVs for a combination of each scintillator crystal and scintillator collimator opening may be designed to provide a 360-degree view of the wellbore with depth resolution. The exemplary inspection tool facilitates inspection of the entire wellbore during a logging operation by moving the inspection tool having the detector assembly along the wellbore axis.

Moreover, the systems and methods of the present application allow inspection of defects in multi-casing/annulus wellbores. In addition, the wellbore may be inspected well past the first casing cement annulus interface using the inspection tool. Also, the inspection tool may be employed in fluid as well as gas-filled wellbores.

The invention claimed is:

1. A detector assembly, comprising:
a plurality of scintillators configured to generate a light signal in response to an impinging backscatter signal from a volume in an object, wherein the plurality of scintillators is arranged in a first pattern, and wherein each scintillator of the plurality of scintillators has a first end and a second end;
a plurality of first detectors, wherein each first detector of the plurality of first detectors is operatively coupled to the first end of a corresponding scintillator and configured to receive a first portion of a light signal from the corresponding scintillator, and wherein the plurality of first detectors is arranged in a second pattern that is aligned with the first pattern of the plurality of scintillators;
a plurality of second detectors, wherein each second detector of the plurality of second detectors is disposed adjacent a corresponding scintillator and optically coupled to the second end of the corresponding scintillator and configured to receive a second portion of the light signal from the corresponding scintillator, and wherein the plurality of second detectors is arranged in a third pattern; and
a scintillator collimator configured to selectively receive the backscatter signal, wherein a first portion of the scintillator collimator is opaque to the backscatter signal, and wherein a second portion of the scintillator collimator comprises a plurality of openings that is transparent to the backscatter signal,
wherein the detector assembly is configured to provide depth resolution, azimuthal resolution, a defect type, a defect size, or combinations thereof.

2. The detector assembly of claim 1, wherein the detector assembly further comprises one or more light guides configured to optically couple the second end of each scintillator to a corresponding second detector, and wherein the one or more light guides are configured to guide the light signal from the scintillator to corresponding the second detector by redirecting the second portion of the light signal by a determined amount.

3. The detector assembly of claim 1, wherein the third pattern of the plurality of second detectors surrounds at least a portion of the first pattern of the plurality of scintillators.

4. The detector assembly of claim 1, wherein each scintillator of the plurality of scintillators comprises a scintillator stack, and wherein the scintillator stack comprises an alternating arrangement of a scintillator crystal and a spacer.

5. The detector assembly of claim 4, wherein each opening in the plurality of openings in the scintillator collimator is aligned with a scintillator crystal in the plurality of scintillators and configured to define a field of view of each scintillator crystal.

6. The detector assembly of claim 1, wherein the first pattern, the second pattern, and the third pattern comprise a circular pattern, a hexagonal pattern, a square pattern, a polygonal pattern, or combinations thereof.

7. The detector assembly of claim 1, wherein a height, a width, or a combination thereof of each opening in the plurality of openings in the scintillator collimator decrease along a direction away from a radiation source, and wherein a distance between neighboring openings in the scintillator collimator increases along a direction away from a radiation source.

8. The detector assembly of claim 1, wherein the first portion of the scintillator collimator comprises a high-density material, and wherein each opening in the plurality of openings in the second portion of the scintillator collimator comprises air, a low-density material, or a combination thereof.

9. The detector assembly of claim 1, wherein the scintillator collimator is configured to surround at least the plurality of scintillators.

10. An inspection tool for monitoring integrity of a wellbore, comprising:
  a radiation source;
  a detector assembly disposed proximate the radiation source, wherein the detector assembly comprises:
    a plurality of scintillators configured to generate a light signal in response to an impinging backscatter signal from a volume of interest in an object, wherein the plurality of scintillators is arranged in a first pattern, and wherein each scintillator of the plurality of scintillators has a first end and a second end;
    a plurality of first detectors, wherein each first detector of the plurality of first detectors is optically coupled to the first end of a corresponding scintillator and configured to receive a first portion of a light signal from the corresponding scintillator, and wherein the plurality of first detectors is arranged in a second pattern that is aligned with the first pattern of the plurality of scintillators;
    a plurality of second detectors, wherein each second detector of the plurality of second detectors is disposed adjacent a corresponding scintillator and optically coupled to the second end of the corresponding scintillator and configured to receive a second portion of the light signal from the corresponding scintillator, and wherein the plurality of second detectors is arranged in a third pattern;
    a scintillator collimator configured to selectively receive the backscatter signal, wherein a first portion of the scintillator collimator is opaque to the backscatter signal, and wherein a second portion of the scintillator collimator comprises a plurality of openings that is transparent to the backscatter signal; and
  a processing unit operatively coupled to the detector assembly, wherein the processing unit comprises at least a processor configured to process signal data from the plurality of first detectors and the plurality of second detectors to determine a condition of the wellbore.

11. The inspection tool of claim 10, further comprising a radiation shield disposed between the radiation source and the detector assembly, wherein the radiation shield is configured to shield the detector assembly from radiation generated by the radiation source.

12. The inspection tool of claim 10, further comprising a tool collar configured to encapsulate the inspection tool.

13. The inspection tool of claim 10, wherein the inspection tool further comprises at least one other detector assembly, wherein the at least one other detector assembly is positioned at an offset with respect to the detector assembly, and wherein the at least one other detector assembly and the detector assembly provide a continuous coverage for the inspection tool in the azimuthal direction.

14. The inspection tool of claim 10, wherein the processing unit is further configured to generate information corresponding to the condition of the wellbore.

15. A method for inspecting a wellbore, the method comprising:
  positioning an inspection tool in the wellbore, wherein the inspection tool comprises:
    a radiation source;
    a radiation shield disposed adjacent the radiation source;
    a detector assembly disposed proximate the radiation source, wherein the detector assembly comprises:
      a plurality of scintillators configured to generate a light signal in response to an impinging backscatter signal from a volume of interest in an object, wherein the plurality of scintillators is arranged in a first pattern;
      a plurality of first detectors configured to receive a first portion of a light signal from the corresponding scintillator, wherein the plurality of first detectors is arranged in a second pattern that is aligned with the first pattern of the plurality of scintillators;
      a plurality of second detectors, wherein each second detector of the plurality of second detectors is disposed adjacent a corresponding scintillator, and wherein the plurality of second detectors is arranged in a third pattern;
      a scintillator collimator comprising a first portion and a second portion and configured to selectively receive the backscatter signal, wherein the first portion of the scintillator collimator is opaque to the backscatter signal, and wherein the second portion of the scintillator collimator comprises a plurality of openings that is transparent to the backscatter signal;
  irradiating the volume of interest in the object with a radiation signal generated by the radiation source;
  receiving, by the plurality of scintillators via the plurality of openings in the scintillator collimator, a backscatter signal from the volume of interest;
  obtaining a first set of signal data from the plurality of first detectors;
  obtaining a second set of signal data from the plurality of second detectors; and
  processing, by a processing unit, the first set of signal data and the second set of signal data to provide a depth resolution and an azimuthal resolution, a defect size, a defect type, or combinations thereof corresponding to a condition of the wellbore.

16. The method of claim 15, further comprising forming the inspection tool, wherein forming the inspection tool comprises:
  providing the radiation source;
  disposing the radiation shield adjacent the radiation source;

forming a detector assembly, wherein the detector assembly is positioned adjacent the radiation shield, and wherein forming the detector assembly comprises:
arranging the plurality of scintillators in the first pattern, wherein each scintillator of the plurality of scintillators has a first end and a second end;
disposing the plurality of first detectors in the second pattern such that the second pattern is aligned with the first pattern of the plurality of scintillators;
positioning the plurality of second detectors in the third pattern;
disposing the scintillator collimator having the first portion and the second portion such that the second portion comprising the plurality of openings is aligned with the plurality of scintillators; and
encapsulating the radiation source, the radiation shield, and the detector assembly in a tool collar to form the inspection tool.

17. The method of claim 16, wherein forming the detector assembly further comprises:
operatively coupling each first detector in the plurality of first detectors to a first side of a corresponding scintillator in the plurality of scintillators;
positioning each second detector in the plurality of second detectors adjacent a corresponding scintillator in the plurality of scintillators; and
optically coupling a second side of each scintillator to a corresponding second detector in the plurality of second detectors via a light guide.

18. The method of claim 16, further comprising positioning at least one other detector assembly detector assembly at an offset with respect to the detector assembly such that the at least one other detector assembly and the detector assembly provide a continuous coverage for the inspection tool in the azimuthal direction.

19. The method of claim 15, wherein receiving, by the plurality of scintillators, comprises:

narrowing a field of view of each scintillator crystal in the plurality of scintillators via a corresponding opening of the plurality of openings in the scintillator collimator; and
detecting by each scintillator crystal in the plurality of scintillators a backscattered signal received from the corresponding opening.

20. The method of claim 19, further comprising:
interrogating each volume along a lateral direction in the wellbore by a corresponding scintillator crystal disposed along a vertical direction in the plurality of scintillators to provide a depth resolution to a wellbore detection volume; and
investigating each location along a circumferential direction in the wellbore by the plurality of scintillators disposed in the first pattern to provide azimuthal resolution to the wellbore detection volume.

21. The method of claim 20, further comprising:
determining an intensity and count rates of the first set of signal data, an intensity and count rates of the second set of signal data, or a combination thereof; and
identifying one of a presence of an anomaly or an absence of an anomaly in the wellbore based on the intensity and count rate of the first set of signal data, the intensity and count rate of the second set of signal data, or combinations thereof.

22. The method of claim 21, further comprising generating positional information corresponding to the identified anomaly to determine a location of the identified anomaly in the wellbore based on the depth resolution.

23. The method of claim 21, further comprising generating a three-dimensional image based on detection volumes corresponding to the lateral direction and the circumferential direction, wherein the three-dimensional image has depth resolution and azimuthal resolution.

* * * * *